(12) United States Patent
Shaffer

(10) Patent No.: US 9,713,908 B2
(45) Date of Patent: Jul. 25, 2017

(54) SUPER COMPACTION OF BIOMASS AND OTHER CARBON-CONTAINING MATERIALS TO HIGH ENERGY CONTENT FUELS

(75) Inventor: David B. Shaffer, Thornton, PA (US)

(73) Assignee: E3BIOENERGY, LLC, Thorton, PA (US)

( * ) Notice: Subject to any disclaimer, the term of this patent is extended or adjusted under 35 U.S.C. 154(b) by 1353 days.

(21) Appl. No.: 12/669,261

(22) PCT Filed: Jul. 18, 2008

(86) PCT No.: PCT/US2008/008789
§ 371 (c)(1),
(2), (4) Date: Jul. 9, 2010

(87) PCT Pub. No.: WO2009/011906
PCT Pub. Date: Jan. 22, 2009

(65) Prior Publication Data
US 2010/0293846 A1    Nov. 25, 2010

Related U.S. Application Data

(60) Provisional application No. 60/950,539, filed on Jul. 18, 2007.

(51) Int. Cl.
*C10L 5/36* (2006.01)
*C10L 5/40* (2006.01)
(Continued)

(52) U.S. Cl.
CPC ............ *B30B 9/067* (2013.01); *B30B 9/3078* (2013.01); *C10L 5/361* (2013.01); *C10L 5/44* (2013.01); *Y02E 50/10* (2013.01); *Y02E 50/30* (2013.01)

(58) Field of Classification Search
CPC .. F26B 5/14; F26B 15/04; C10L 5/363; C10L 5/361; C10L 5/46; C10L 2200/0484; C10L 5/40; C10L 5/403; C10L 5/402
(Continued)

(56) References Cited

U.S. PATENT DOCUMENTS 1,484,302 A    2/1924  Garrett
2,697,979 A  * 12/1954  MacMurray .................. 100/116
(Continued)

FOREIGN PATENT DOCUMENTS

GB         1397133    *  6/1975
GB         1397133    *  6/1976
(Continued)

*Primary Examiner* — Ellen McAvoy
*Assistant Examiner* — Ming Cheung Po
(74) *Attorney, Agent, or Firm* — Baker & Hostetler LLP

(57) ABSTRACT

A super compactor receives a carbon-containing material and delivers a brick suitable as fuel for power generation. A compaction chamber receives the carbon-containing material and has at least one ram reciprocating along a travel path and exerting a predetermined amount of pressure on the carbon-containing material. The compaction chamber also has an end effector plate or a movable slide gate against which the carbon-containing material is compressed, promoting the removal of moisture from the carbon-containing material, and one or more dewatering apertures or a membrane permitting moisture to pass through but blocking the carbon-containing material. A collector captures the moisture that passes through the dewatering apertures or membrane. A power unit provides power to the at least one ram. A heated extrusion chamber receives the carbon-containing material from the compaction chamber and heats and compacts the carbon-containing material to bind the carbon-containing material into the form of a brick.

19 Claims, 15 Drawing Sheets

(51) Int. Cl.
   *B30B 9/06* (2006.01)
   *B30B 9/30* (2006.01)
   *C10L 5/44* (2006.01)

(58) Field of Classification Search
   USPC .......................................... 44/530, 550, 605
   See application file for complete search history.

(56) References Cited

U.S. PATENT DOCUMENTS

| | | | |
|---|---|---|---|
| 3,172,823 A * | 3/1965 | John et al. .............. | C10B 53/08 201/34 |
| 4,630,535 A | 12/1986 | Haygreen | |
| 4,996,454 A * | 2/1991 | Peczalski ............. | H03K 19/096 326/55 |
| 4,996,918 A * | 3/1991 | Carter ................. | B02C 18/0084 100/221 |
| 5,001,975 A * | 3/1991 | Finden .................... | B30B 9/067 100/232 |
| 5,125,931 A | 6/1992 | Schulz | |
| 5,299,142 A * | 3/1994 | Brown .................. | B30B 9/3007 100/229 A |
| 5,400,726 A | 3/1995 | Dumons | |
| 5,413,746 A | 5/1995 | Birjukov | |
| 5,429,454 A * | 7/1995 | Davis ........................ | B09B 1/00 405/129.2 |
| 5,630,362 A * | 5/1997 | Jonsson ................... | B30B 1/18 100/126 |
| 6,395,926 B1 | 5/2002 | Holtzapple et al. | |
| 6,692,544 B1 * | 2/2004 | Grillenzoni ............. | C10L 5/361 428/2 |

FOREIGN PATENT DOCUMENTS

| | | |
|---|---|---|
| JP | 60-028495 | 2/1985 |
| JP | 2003-010899 | 1/2003 |
| WO | WO 2004-015041 | 2/2004 |

* cited by examiner

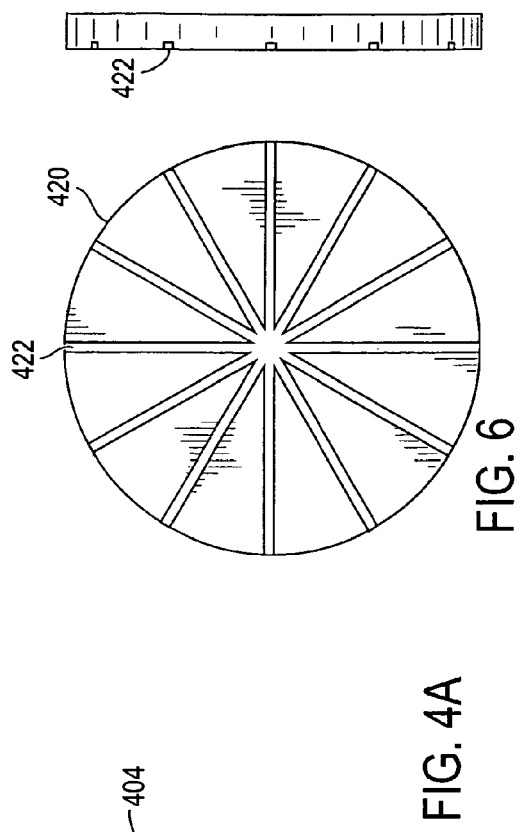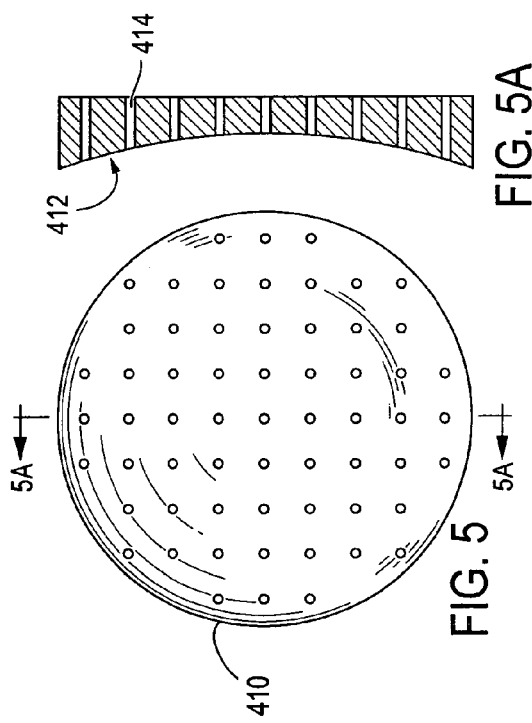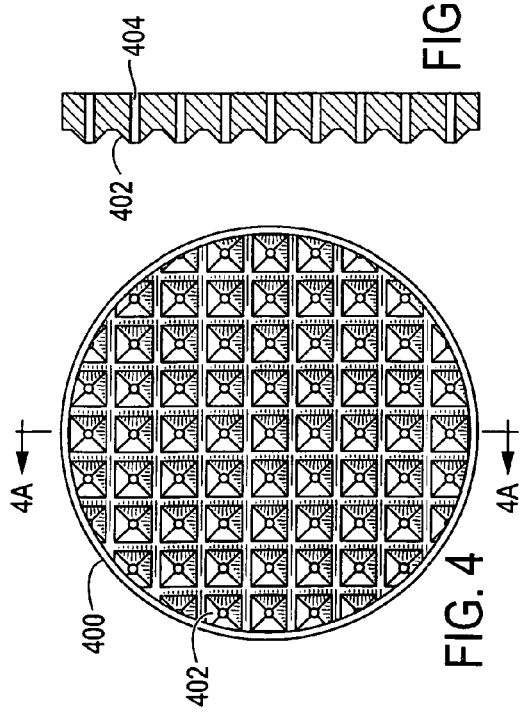

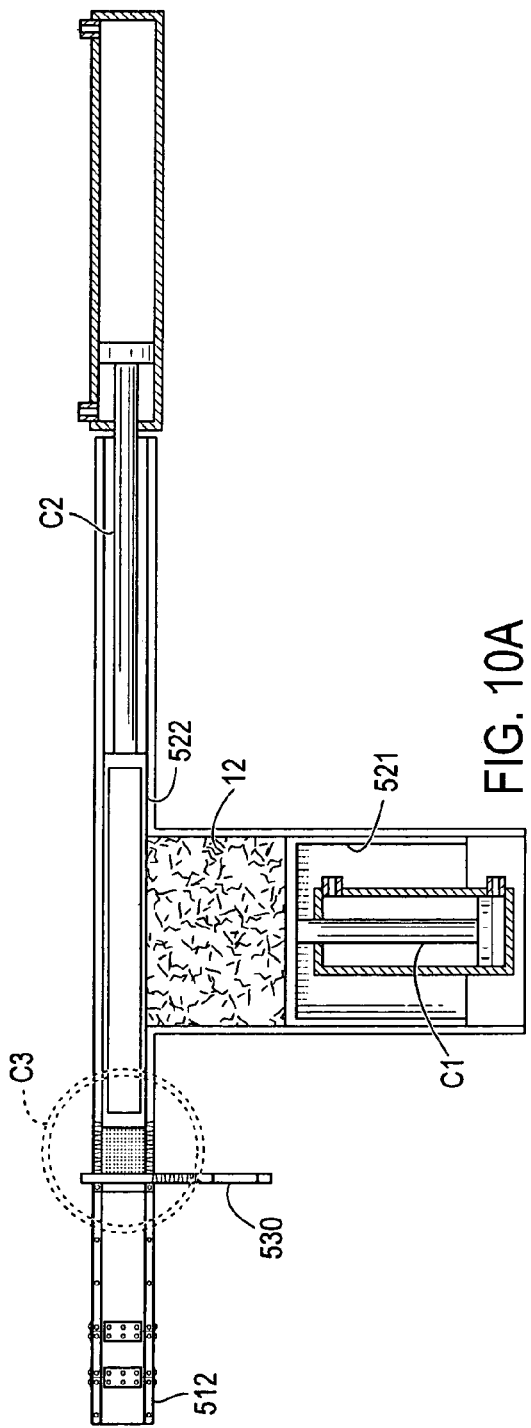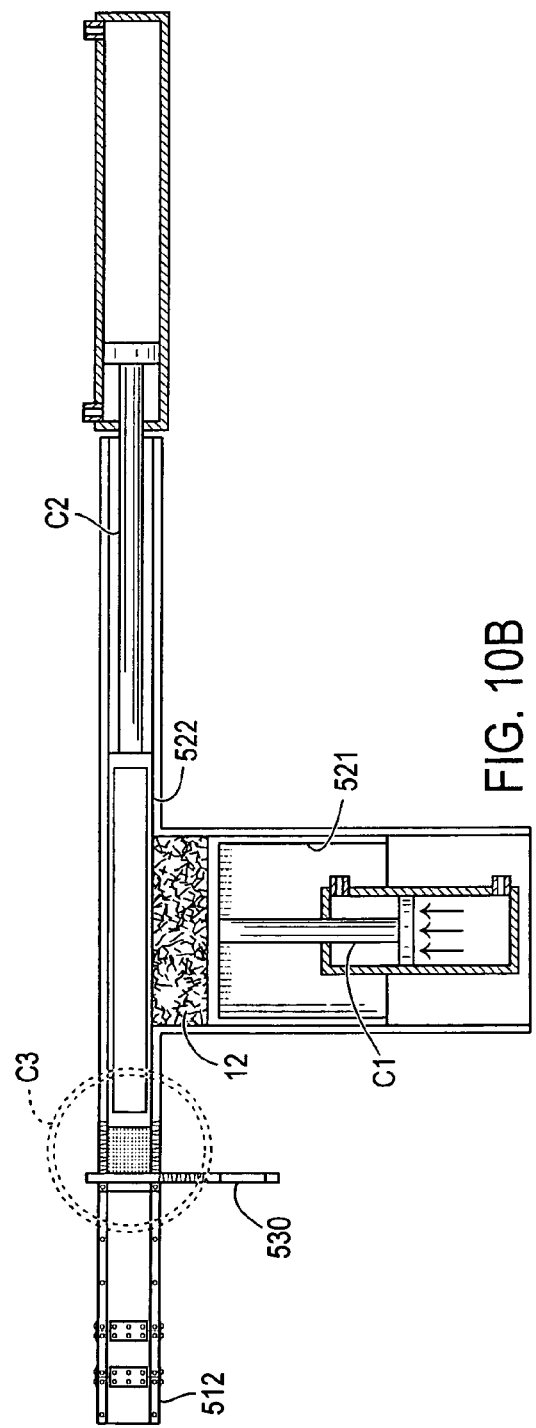

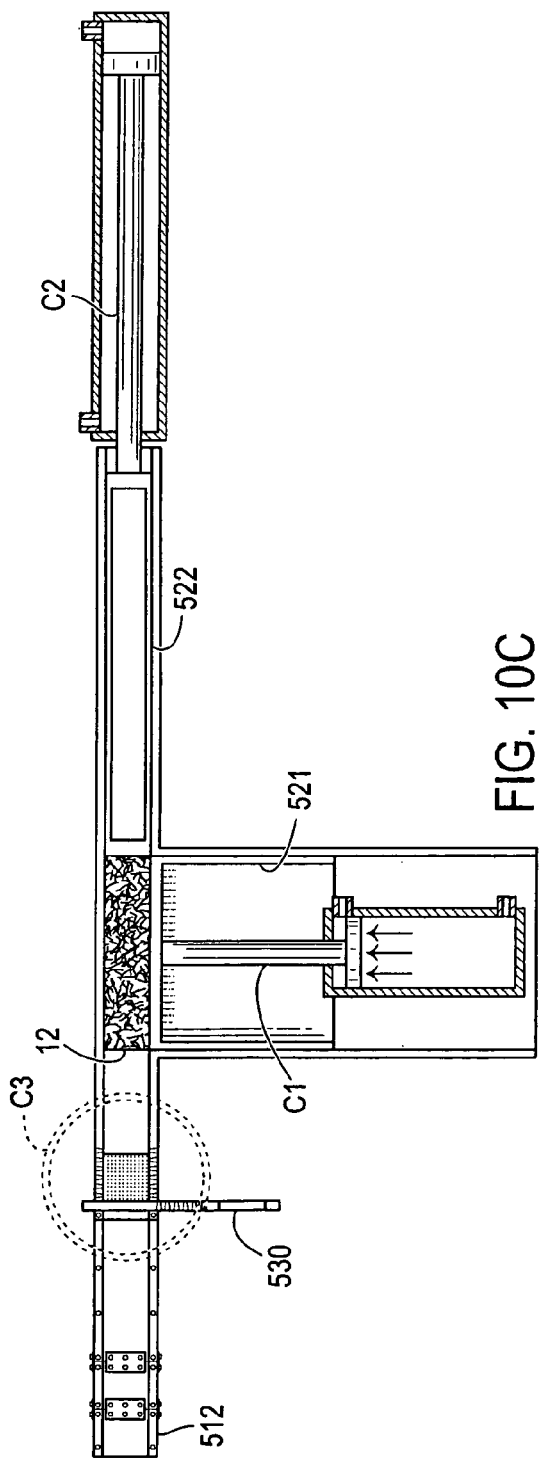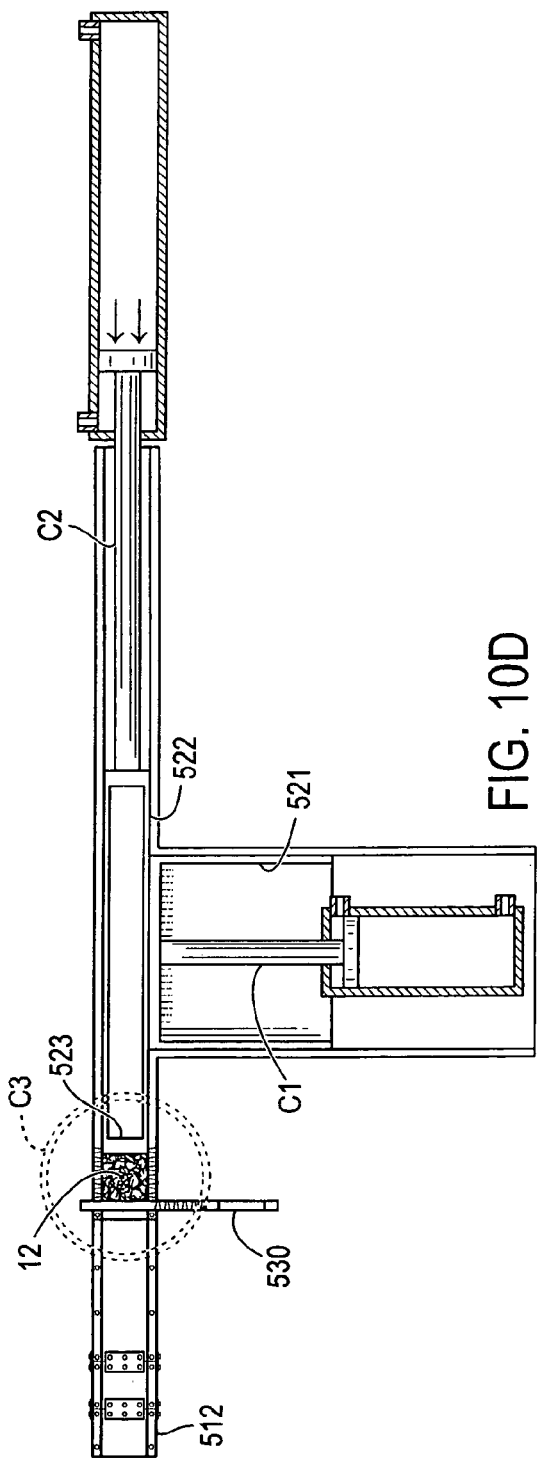

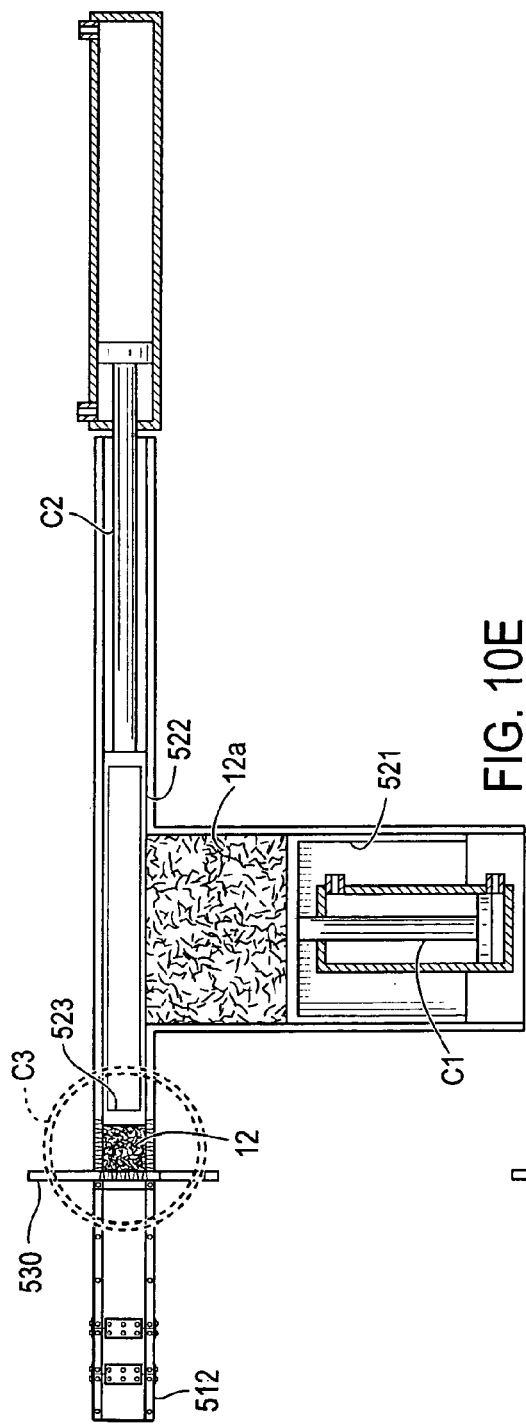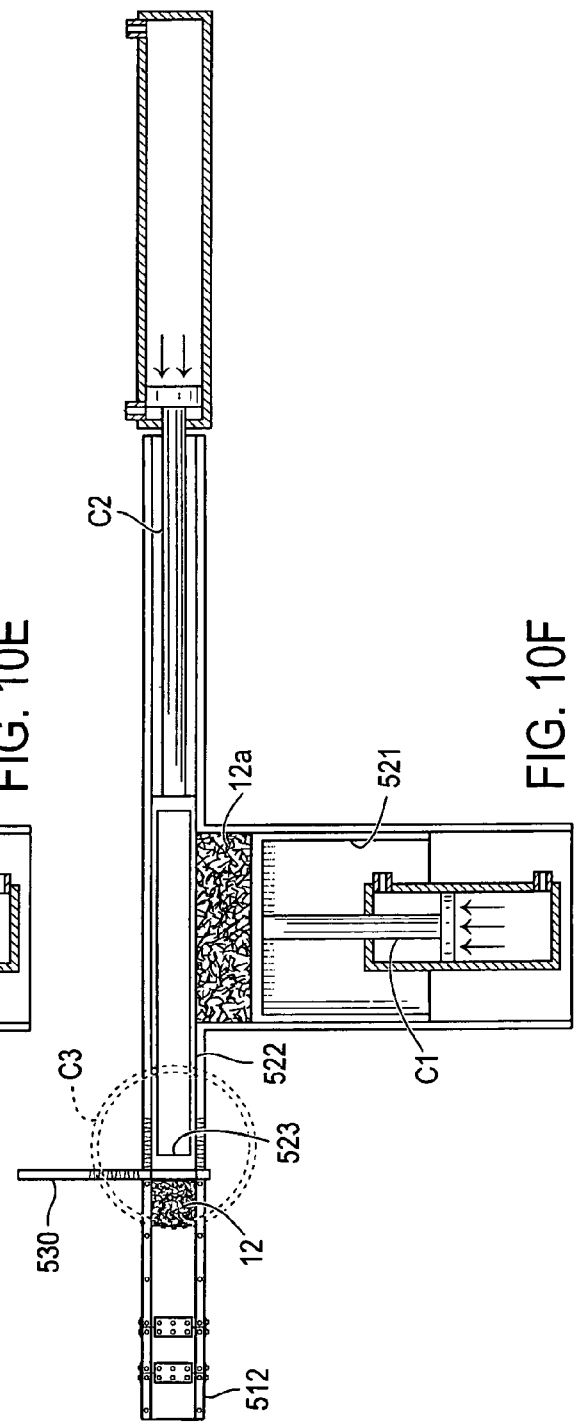

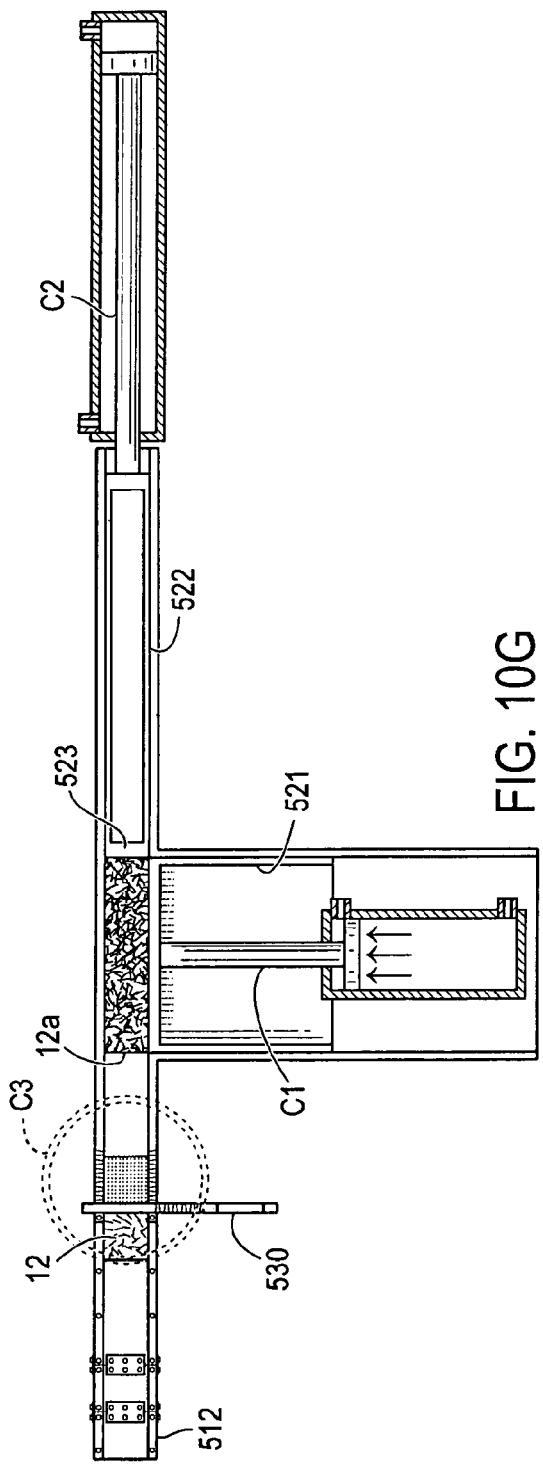
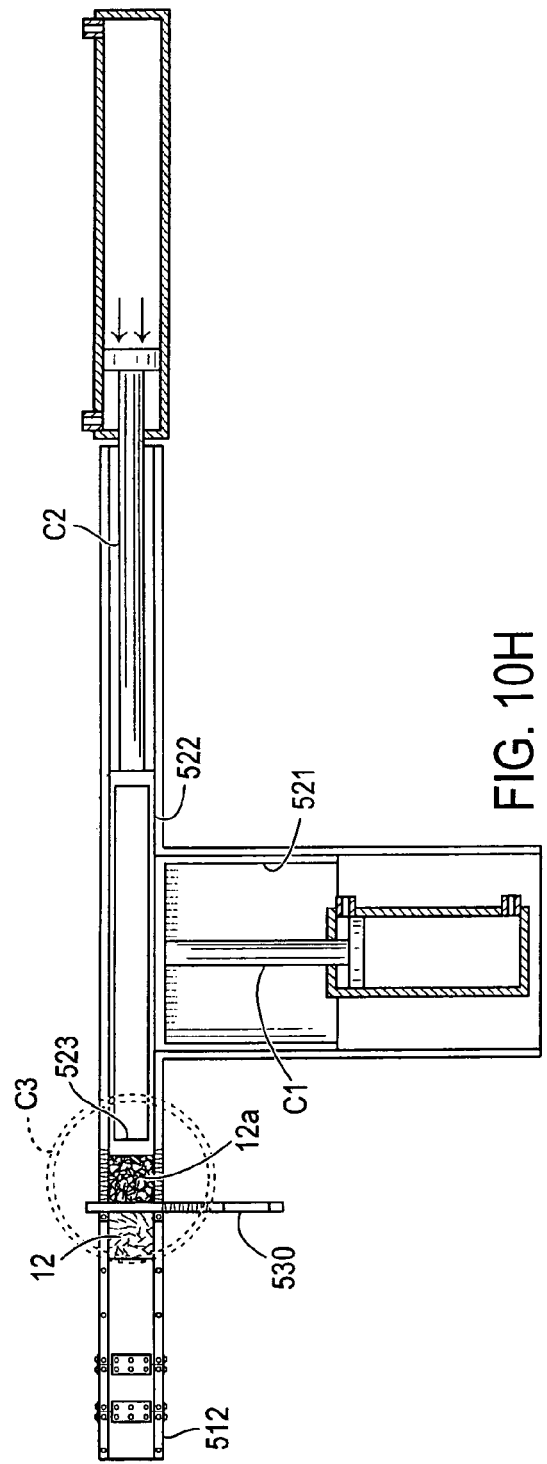

SUPER COMPACTION OF BIOMASS AND OTHER CARBON-CONTAINING MATERIALS TO HIGH ENERGY CONTENT FUELS

CROSS-RERFERENCE TO RELATED APPLICATIONS

This application is the National Stage of International Application No. PCT/US2008/008789, filed Jul. 18, 2008, which claims the benefit of U.S. Provisional Application No. 60/950,539, filed Jul. 18, 2007, the entireties of which are incorporated herein in their entireties for any and all purposes.

FIELD OF THE INVENTION

The present invention relates generally to the fields of converting biomass to fuel and super compaction technologies and, more specifically, to the fields of generating electricity and producing feed stock for ethanol production and gasification using biomass.

BACKGROUND OF THE INVENTION

Biomass is generally defined as living and recently dead biological material which is capable of being used as a renewable fuel for purposes of energy production. Most commonly, biomass refers to plant matter grown for use as biofuel, but it also includes plant or animal matter used for production of fibers, chemicals, or heat. Biomass may also include biodegradable wastes that can be burned as fuel. It excludes organic material which has been transformed by geological processes into substances such as coal or petroleum. Although fossil fuels have their origin in ancient biomass, they are not considered biomass by the generally accepted definition because they contain carbon that has been "out" of the carbon cycle for a very long time. Their combustion therefore disturbs the carbon dioxide content in the atmosphere.

Biomass is grown from several plants, including miscanthus, switchgrass, hemp, corn, poplar, willow, sugarcane, and oil palm (palm oil). The particular plant used is usually not very important to the end products, but it does affect the processing of the raw material. Production of biomass is a growing industry as interest in sustainable fuel sources is growing. The nature of biomass material presents various obstacles, however, to the wide-scale commercial use of biomass for energy production.

One of these obstacles stems from the fact that biomass normally has very high moisture content—about 50% to 80%, or even higher—which results in a low BTU value per unit weight of biomass. (The term "BTU" is used to describe the heating value or energy content of fuels.) The low heating value in turn hampers combustion, which renders energy production from biomass an inefficient process. Accordingly, capital investment in biomass combustion equipment is often cost-prohibitive and impractical for commercial energy production.

Another obstacle to commercial use of biomass for energy production is that biomass is normally lighter and less dense than traditional fossil fuel (i.e., the biomass is fluffier). The low density of biomass is attributable to a large void space typical of biomass material. At present, the delivered BTU per dollar cost of biomass is economically unfavorable compared to the BTU per dollar cost associated with energy production from traditional fossil fuels. The unfavorable economics of biomass-to-energy conversion arising from the large void space and low density of biomass material makes shipping large amounts of biomass BTUs very costly and impractical for energy production.

Yet another obstacle is the difficulty in storing biomass. Biomass tends to rot or degrade quickly; it has a relatively short shelf life. The consequent need to process biomass quickly limits handling options and undermines the economic viability of using biomass commercially. A further obstacle is that some biomass, particularly herbaceous biomass, is very high in water-born alkalinity which can harm traditional furnaces and boilers. This alkalinity renders herbaceous biomass impractical as a source of fuel for energy production.

Accordingly, there is a pressing need to increase the amount of energy per unit weight of biomass. There is also a pressing need to convert biomass to a solid fuel economically and practically. There is also a pressing need to improve the efficiency of generating electrical energy from biomass.

SUMMARY OF THE INVENTION

To meet these and other needs, and in view of its purposes, the present invention provides a super compactor receiving a carbon-containing material and delivering a brick suitable as fuel for power generation and producing feed stock for ethanol production and gasification. A compaction chamber receives the carbon-containing material and has (a) one or more rams each reciprocating along a travel path and exerting a predetermined amount of pressure on the carbon-containing material; (b) an end effector plate or a movable slide gate against which the carbon-containing material is compressed, promoting the removal of moisture from the carbon-containing material; and (c) one or more dewatering apertures or a membrane permitting moisture to pass through but blocking the carbon-containing material. A collector captures the moisture that passes through the dewatering apertures or membrane. A power unit provides power to the ram(s). A heated extrusion chamber receives the carbon-containing material from the compaction chamber and heats and compacts the carbon-containing material to bind the carbon-containing material into the form of a brick.

The present invention also provides a method of creating a brick suitable as fuel for power generation and for producing feed stock for ethanol production and gasification from a carbon-containing material. The method includes a number of steps: (a) gathering the carbon-containing material; (b) pre-processing the carbon-containing material to a suitable size and water content; (c) delivering the carbon-containing material to a super compactor; (d) actuating the super compactor to exert a predetermined amount of pressure of between about $2.7 \times 10^7$ to $1.4 \times 10^9$ Pa on the carbon-containing material, thereby squeezing water out of and collapsing voids in the carbon-containing material; (e) collecting the water squeezed out of the carbon-containing material; and (f) heating the carbon-containing material to form a brick.

The present invention still further provides a solid fuel composition. The solid fuel composition is formed from a raw biomass material having a first moisture content, a first volume, and a first alkalinity. The solid fuel composition includes at least one compressed biomass material having a second moisture content that is about 50% or less of the first moisture content and a second volume that is reduced relative to the first volume by a factor of about 10:1 or more.

The compressed biomass material also has a second alkalinity that is reduced relative to the first alkalinity by more than 50% per MM BTU.

Several aspects of the present invention pertain to super compaction methods and systems for biomass super compaction and liquid removal from the biomass. The methods and systems described in this document alleviate the moisture and void space problems described above. The disclosed methods and systems give rise to a novel form of biomass with drastically reduced moisture content and void space characteristics. This novel form of biomass created by the disclosed compaction and drying method and system facilitates cost-effective transport and combustion of the biomass for use in energy production, e.g., electrical power generation.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 4 is a head-on view of an end effector plate with a surface profile having raised diamonds and apertures extending through the plate;

FIG. 4A is a cross-sectional view of the end effector plate shown in FIG. 4;

FIG. 5 is a head-on view of an end effector plate with a concave dish profile having apertures extending through the plate;

FIG. 5A is a cross-sectional view of the end effector plate shown in FIG. 5;

FIG. 6 is a head-on view of an end effector plate with a starburst surface profile having apertures extending through the plate;

FIG. 6A is a cross-sectional view of the end effector plate shown in FIG. 6;

FIG. 8A is a cross-sectional view taken along the line 8A-8A of FIG. 8;

FIG. 10A illustrates the first of eight steps of the operational sequence by which the compactor shown in FIGS. 7, 8, 8A, and 9 compresses raw biomass material;

FIG. 10B illustrates the second step of the operational sequence begun in FIG. 10A;

FIG. 10C illustrates the third step of the operational sequence begun in FIGS. 10A and 10B;

FIG. 10D illustrates the fourth step of the operational sequence begun in FIGS. 10A, 10B, and 10C;

FIG. 10E illustrates the fifth step of the operational sequence begun in FIGS. 10A, 10B, 10C, and 10D;

FIG. 10F illustrates the sixth step of the operational sequence begun in FIGS. 10A, 10B, 10C, 10D, and 10E;

FIG. 10G illustrates the seventh step of the operational sequence begun in FIGS. 10A, 10B, 10C, 10D, 10E, and 10F;

FIG. 10H illustrates the eighth step of the operational sequence begun in FIGS. 10A, 10B, 10C, 10D, 10E, 10F, and 10G.

DETAILED DESCRIPTION OF ILLUSTRATIVE EMBODIMENTS

Figure 1:
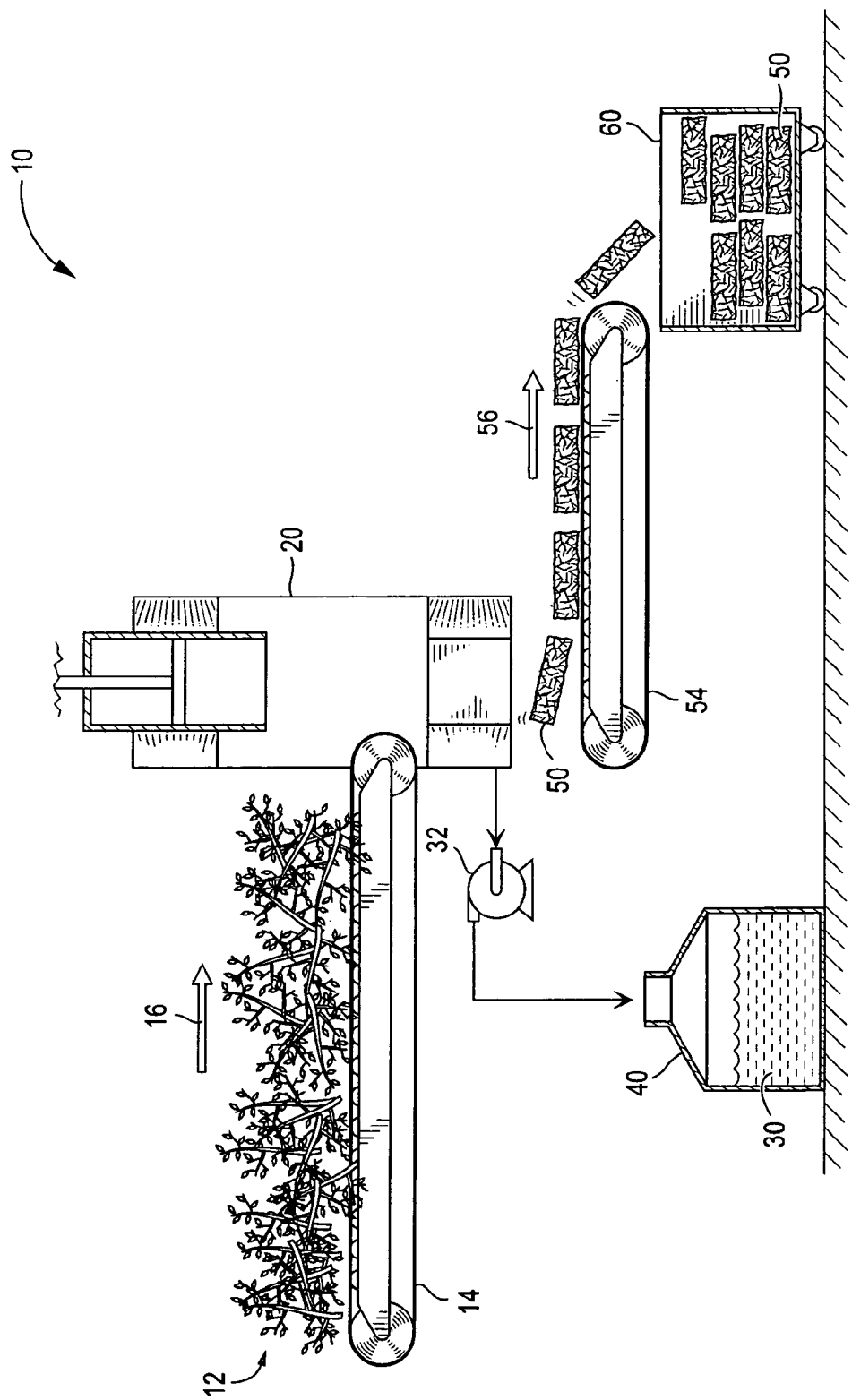
FIG. 1 illustrates an embodiment of a biomass super compaction and drying system according to the present invention.

The present invention can be understood more readily by reference to the following detailed description taken in connection with the accompanying figures and examples, which form a part of this disclosure. It is to be understood that the invention is not limited to the specific devices, methods, conditions, or parameters described and shown, and that the terminology adopted is for the purpose of describing particular embodiments by way of example only and is not intended to be limiting. Also, as used in the specification including the appended claims, the singular forms "a," "an," and "the" include the plural, and reference to a particular numerical value includes at least that particular value, unless the context clearly dictates otherwise.

When a range of values is expressed, another embodiment includes from the one particular value to the other particular value. All ranges are inclusive and combinable. Further, reference to values stated in ranges includes each and every value within that range.

Similarly, when values are expressed as approximations, by use of the antecedent "about," it can be understood that the particular value forms another embodiment. It is to be appreciated that certain features of the invention which are, for clarity, described in the context of separate embodiments may also be provided in combination in a single embodiment. Conversely, various features of the invention that are, for brevity, described in the context of a single embodiment may also be provided separately or in any subcombination.

A. Overview of the Invention

In several aspects of the present invention, the biomass feedstock used in the disclosed methods can comprise any of a variety of biomass sources, as well as combinations of those sources, which contain incompressible liquids. Suitable sources of biomass feedstock include plant matter, animal matter, sea matter (e.g., fish, kelp, sea plants, seaweed, and the like), organic waste, and other materials of biological origin. Examples of plant matter include wood, leaves, grasses, energy crops, tree trimmings, waste plant matter used in food production such as crop waste (e.g., corn stalks, wheat chaff, and the like), sugarcane (e.g., bagasse), fruit and vegetable waste (e.g., banana peels, orange peels, lemon peels, lime peels, potato peels, melon rinds, seeds, pits, and the like), as well as whole fruits, whole vegetables, whole grains, whole grasses, and the like.

Bagasse is high sugar content shredded cane, a byproduct of sugar processing, which contains from about 45% to about 65% water by weight. The energy content of bagasse is between about 3,500 and 4,500 BTU per pound. Removing water increases the energy content per weight of the bagasse. In several embodiments of the present invention, the super compaction process removes more than half the remaining water to create a super compacted solid mass of sugarcane (e.g., a bagasse biobrick). A large fraction of the water is removed from the bagasse during the super compaction process in making the biobrick. For example, the water content within the biobrick is as low as 25% based on the weight of the biobrick, or even as low as 20% based on the weight of the biobrick, or even as low as 15% based on the weight of the biobrick, or even as low as 10% based on the weight of the biobrick, or even as low as 5% based on the weight of the biobrick, or even as low as 2% based on the weight of the biobrick, or even as low as 1% based on the weight of the biobrick, or even lower, approaching essentially zero water. When the water content of the biobrick is reduced to about 10%, the energy content of the biobrick based on the weight increases by about 100%.

When sugarcane or bagasse is used as the biomass for making the biobricks, the water that is squeezed out can comprise a substantial amount of sugar. Thus, the fluid that is squeezed out of the biomass according to the super compaction processes is itself a potentially valuable product stream. The sugar water that is squeezed out of the biomass of bagasse can be used to make ethanol, for example, or can be used in the production of sugar or cane juice.

Heat may advantageously be applied in the final stage of the process used to create a biobrick. Such heat causes the biobrick to bind due to the melting of the plant lignins. This melting of the plant lignins is also capable of producing a protective barrier coating surrounding the biobrick.

Wood can be processed using the super compaction techniques of the present invention. For wood, a predetermined amount of pressure and heat is applied to get the lignin (i.e., sap) within the wood to migrate throughout the biobrick during the pressurization process, and to seal the surfaces and create a protective barrier coating. By "predetermined" is meant determined beforehand, so that the predetermined characteristic (e.g., pressure or temperature) must be determined, i.e., chosen or at least known, in advance of application.

For some biofuels, the biomass may contain an additional binding agent blended in with the biomass, such as paraffin or starch. In certain embodiments, it is desirable to mix a harder type of biomass with softer or stickier types of biomass. For example, it is possible to mix sawdust with bagasse for its binding properties.

In addition to removing water and other fluids, the super compaction process also substantially reduces the volume of the biomass. The volume of the biomass is reduced by a factor of at least 10 to 1, 20 to 1, 30 to 1, or even 40 to 1. Such improvements in volume reduction in turn improve the economics of transportation and handling of the biomass fuel.

Exemplary methods of biomass super compaction and drying are conducted as follows. Whether raw biomass or partially processed biomass, the biomass is super compacted in a hydraulically powered super-compactor capable of exerting forces between about 4,000 and about 200,000 psi ($2.76 \times 10^7$ to $1.4 \times 10^9$ Pa) (to convert from pounds-force per square inch to pascals (Pa), the corresponding unit in the International System, multiply by $6.9 \times 10^3$), or at least about 10,000 psi, or least about 20,000 psi, or least about 30,000 psi, or least about 40,000 psi, or least about 50,000 psi, or at least about 75,000 psi, or least about 100,000 psi, or at least about 200,000 psi. Even higher pressures are potentially useful in various aspects of the disclosed methods of the present invention. Without being bound by any particular theory of operation, such large pressures cause incompressible fluids contained within the biomass to be squeezed from the biomass, and collapse the voids (e.g., air pockets) inherent in most biomass sources.

Typically, any biomass material smaller in size than about 61 cm (24 inches) long can be used in the present invention. Larger biomass materials can be preprocessed such as by cutting, chopping, shredding, and the like to create smaller sizes.

Animal products and byproducts (e.g., manure) may also be processed according to the super compaction process of the present invention. Animal products and manure often have a high water content, typically greater than 50%, or even greater than 60%, or even greater than 70%, or even greater than 80%. Accordingly, biomass containing excess water can be preprocessed to reduce the water content to 60% or less, or even 50% or less. Suitable methods of pre-processing to remove water include centrifugation, as well as other types of solids-drying techniques known in the art.

The super compaction process can be implemented in connection with recycling and waste hauling infrastructure throughout municipalities to generate biomass bricks. Accordingly, one aspect of the present invention pertains to systems in which biomass and recycled matter are collected by a waste hauler. The collected biomass and recycled matter are transported to a super compaction station. At the station, the biobricks and other high density energy bricks containing a combination of biomass, recycled matter, and the like, are manufactured from the collected biomass and recycled matter.

Typically, the water content of the biobricks will be higher than the ambient concentration of water in the surrounding environment. Accordingly, it is desired to maintain a dry environment in order to keep a low water content within the biobricks. Ways to reduce the ambient humidity include using dry air, using nitrogen, as well as using elevated temperatures in order to reduce the water content. A beneficial feature of the super compacted and heat-seared biobrick is that it is somewhat less prone to re-absorption of moisture due to ambient humidity.

Equipment suitable for conducting super compaction processes can be obtained by modifying commercially available super compactors with dies that are adapted for forming biomass into a suitable brick or other shaped object at super compaction pressures, and which permit the removal of water, gases, and other fluids. Commercial sources of super compaction equipment and processes are well known in the nuclear waste processing industry. Examples of companies that make this equipment include Container Products Corp. of Wilmington, N.C. (http://www.c-p-c.com/) and Fontijne Grotnes BV in the Netherlands (http://www.fontijne.nl).

Suitable hydraulic presses are known in the art and can provide pressing in one direction, two directions, or even three directions. Suitable super compaction equipment may contain one or more chambers, for example, a one chamber press, a two chamber press, or even a three chamber press.

In one embodiment, a press having a predetermined number of chambers is designed to super compact 25 tons of biomass per hour. In this embodiment, 1,000,000 tons of sugarcane bagasse is used as feedstock and approximately 400,000 tons of sugar water is pressed out of the sugar cane bagasse leaving about 600,000 tons of super compacted biobricks.

In one embodiment, suitably adapted dies contain a porous membrane capable of withstanding the necessary pressures in the super compaction process, while also permitting the escape of gases and liquids (fluids) such as water. Suitable permeable membranes can be made out of metal, plastics, and other materials such as composites. For example, high pressures can be achieved by hydraulically pressurizing biomass in a suitably adapted die at pressures in excess of 50,000 psi, and fluid is removed through a porous membrane, for example by using a conduit having a low-pressure source for aspirating, or otherwise sucking, the fluid that has permeated through the membrane. A suitable permeable membrane keeps back solid matter and allows water to permeate. The water can be removed while pressing, or the water can be removed after the step of pressing has been completed. Suitable membranes may be constructed from a continuous web of porous metal held in place. The membranes can be replaced as needed, such as when they become clogged.

In certain embodiments, the process can be operated by increasing pressure to press the biomass and permeating water from the biomass through the porous membrane. The process further includes the additional steps of reducing the pressure, removing water, and repeating the cycle. Various combinations of pressurization, depressurization, and water removal process steps are possible, and are repeated as needed to reduce the water (or other fluid) content within the biomass to create a suitable biobrick.

An exemplary super compaction program for sugarcane bagasse follows, with reference to the one-stage biomass super compaction and drying system 10 of FIG. 1. Raw biomass material 12 (e.g., sugarcane bagasse) is delivered to a super compactor 20 by a suitable transportation device such as a conveyor 14 traveling toward the super compactor 20 along the direction arrow 16. The raw biomass material 12 is placed in a die within the super compactor 20. The raw biomass material 12 is compressed within the die, and pressure is increased over a period of about one minute to a pressure within the range of from about 10,000 to about 20,000 psi. The die includes dewatering apertures, through which water permeates. A biobrick 50 of dimensions 12 inches by 12 inches by six inches (in the squeezing direction) and of mass of about 40 pounds results.

The biobrick 50 can be removed from the super compactor 20 by a suitable transportation device such as a conveyor 54 traveling away from the super compactor 20 along the direction arrow 56. The conveyor 54 delivers the biobrick 50 to a suitable storage location, such as a bin 60. The compacted and dried biobricks 50 can be used for energy production.

Total pressurization times for this example will be in the range of from about one to two minutes. A variety of pressurization times can be achieved, for example, for less than a minute up to tens of minutes.

A protective barrier coating can be created by melting lignins in the plant matter upon the application of heat after super compacting. Lignins are present in most plant material. The protective barrier coating inhibits or prevents permeation of water and air (i.e., oxygen). As a result, biobricks 50 are particularly useful as they can have a barrier coating that will help to maintain the shelf life of such biobricks 50. Suitable barrier coatings are capable of preventing the biobrick 50 from reabsorbing water upon sitting in a moist ambient environment.

Other non-biomass materials can be blended in with biomass. Amounts of such other materials can be up to 5%, 10%, 15%, 20%, 25%, 30%, 35%, 40%, 45%, 50%, 55%, 60%, 65%, 70%, or even up to 75%, depending on the type of material.

The biobricks 50 can be super compacted from any of a variety of materials into any of a variety of shapes and sizes. For example, small biobrick objects less than 1 inch cubed, or 1 inch in diameter, can be readily pressed according to the processes of the present invention. Larger biobrick objects are also envisioned having dimensions as large as 24 inches in one dimension, for example, a biobrick that is 24×24×6 inches.

A number of different types of materials, having been subjected to the super compaction process, are capable of yielding diesel-type fuels. For example, the super compaction of orange peels gives rise to orange oil, which can be used as a biofuel. Other biomasses give rise to diesel-type fuels as well. The super compaction process can also be applied to other carbon- and hydrocarbon-containing materials. For example, water and oils can be removed from coal and various hydrocarbon materials including bituminous coal, peat moss, as well as low grade coals.

Liquids 30 squeezed from the biomass can be removed from the super compactor 20 using a suitable fluid removal or extraction system 32, such as a vacuum pump or other aspirating mechanism. Once removed, the incompressible fluids 30 can be stored in a collection vessel 40. The extracted liquids are then further refined to produce usable byproducts including but not limited to ethanol, bio-diesel turpentine, and other similar liquid fuel products.

This method of compaction and drying results in a novel form of biomass with significantly reduced void space from the original feedstock, with a compaction ratio in a range of from 10-to-1 to 1,000-to-1, which equates to a similar reduction in void space. Further, the novel form of biomass created by this method of compaction and drying has an entrained moisture content of less than 30 percent. The compacted and dried biomass has a significantly increased BTU per pound value relative to the biomass feedstock, and is suitable for cost-effective use as fuel in certain commercial energy production facilities.

The method of compaction and drying is energy efficient, because performing the method requires significantly less energy than the heat required to evaporate the moisture that is removed from the material.

The biobricks 50 made according to the present invention can be fed into a coal-fired power plant or a variety of industrial boilers for use as fuel as well as being used as a feed stock for ethanol and bio-diesel production. Three types of boilers are common: a circulating fluidized bed (CFB) boiler; a cyclone boiler; and a stoker grade boiler. In various boilers, the biobricks 50 can be fed into a furnace as cubes, or pulverized and fed into a furnace as powder or particles. Alternatively, the biobricks 50 can be fed into a suitable macerator or grinder to make biobrick powder, which is then blown into a furnace using any suitable pneumatic transporter.

There are a number of advantages of using biobricks 50 in coal-fired power plants and industrial furnaces. One advantage is reduced emissions. Another advantage is that (relative to combustion) biobricks 50 constitute a carbon dioxide ($CO_2$) neutral fuel; the biobricks 50 are considered a zero emission greenhouse gas fuel. Biobricks 50 contain very little sulfur and virtually no mercury or other heavy metals. Accordingly, a reduction of the carbon cycle is achieved from 10 million years (such as for coal) to a nine-month carbon cycle. The environmental benefits of the super compaction technology for making biobricks 50 are seemingly great. The use of biobricks 50 made from biomass waste also gives rise to carbon credits that can be recovered for the non-production of methane from rotting biomass as well as the generation of $CO_2$ credits for burning biomass instead of coal. Other environmental benefits that arise from the use of biobricks 50 to replace the use of coal for generating electricity, heat, and steam include a much lower production of $NO_x$ and $SO_2$. Accordingly, there is a lower need for absorbents in scrubbing, which reduces capital expenditures and operating costs of power plants.

Biobricks 50 can also be mixed with coal to a certain degree and fed into coal-burning power plants and industrial furnaces. The results include electricity and steam, which can be used in turn for steel making and for refineries. Petroleum coke and coal can also be mixed with biobricks 50.

B. Bench Scale Biomass Compactor

Figure 2A:
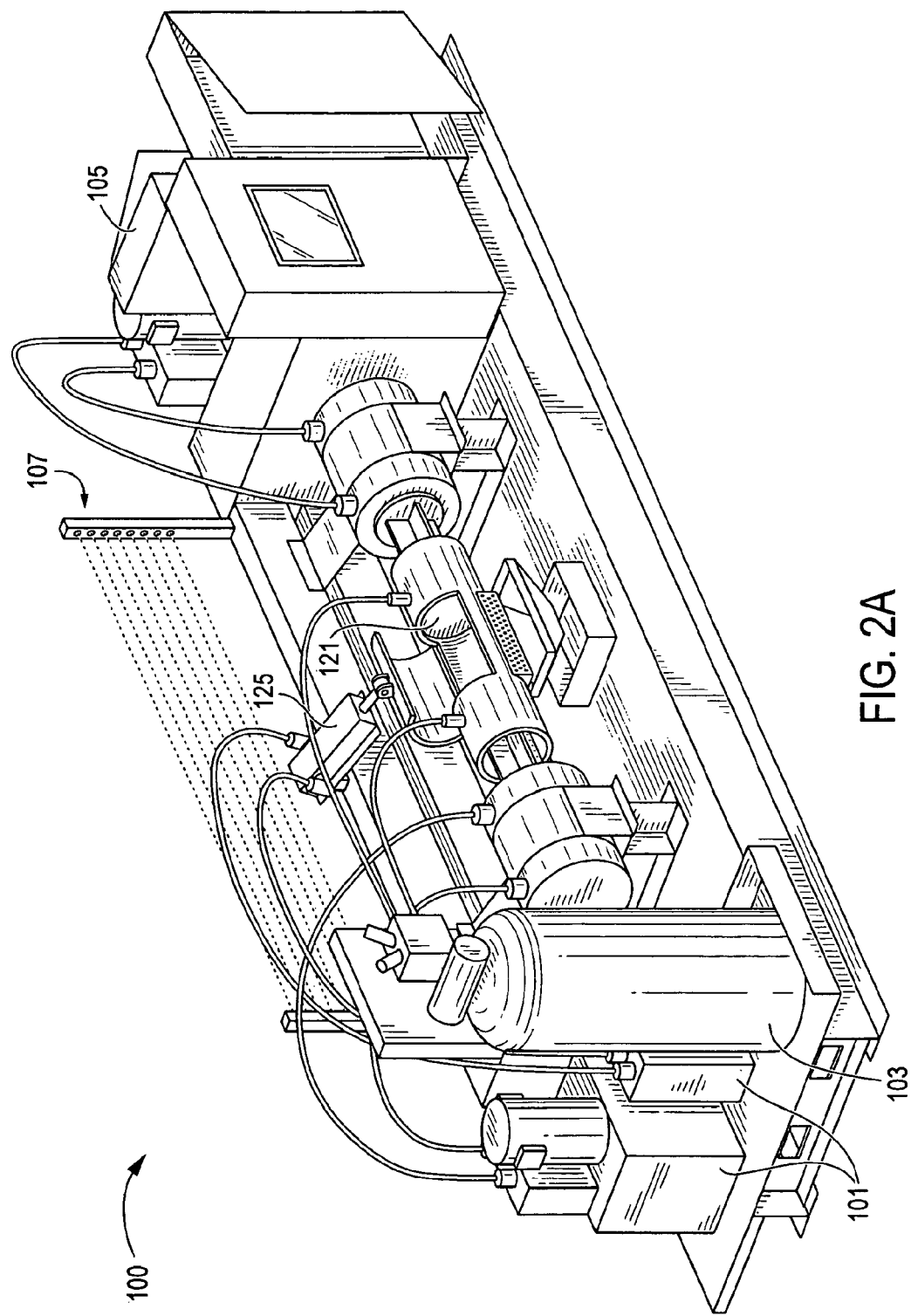
FIG. 2A depicts a bench scale biomass compactor having horizontally opposed rams according to an embodiment of the present invention.

FIG. 2A depicts a bench scale configuration of an exemplary, non-limiting, single stage biomass compactor 100. Hydraulic power units 101 shown at one end of the compactor 100 provide compressive force to the compression ram to which they are connected. One or more additional hydraulic power units (not labeled) may be suitably provided at the opposite end of the compactor 100 to provide power to a second compression ram. Other mechanisms for providing power to the compression rams will be apparent to those of ordinary skill in the field.

Figure 2B:
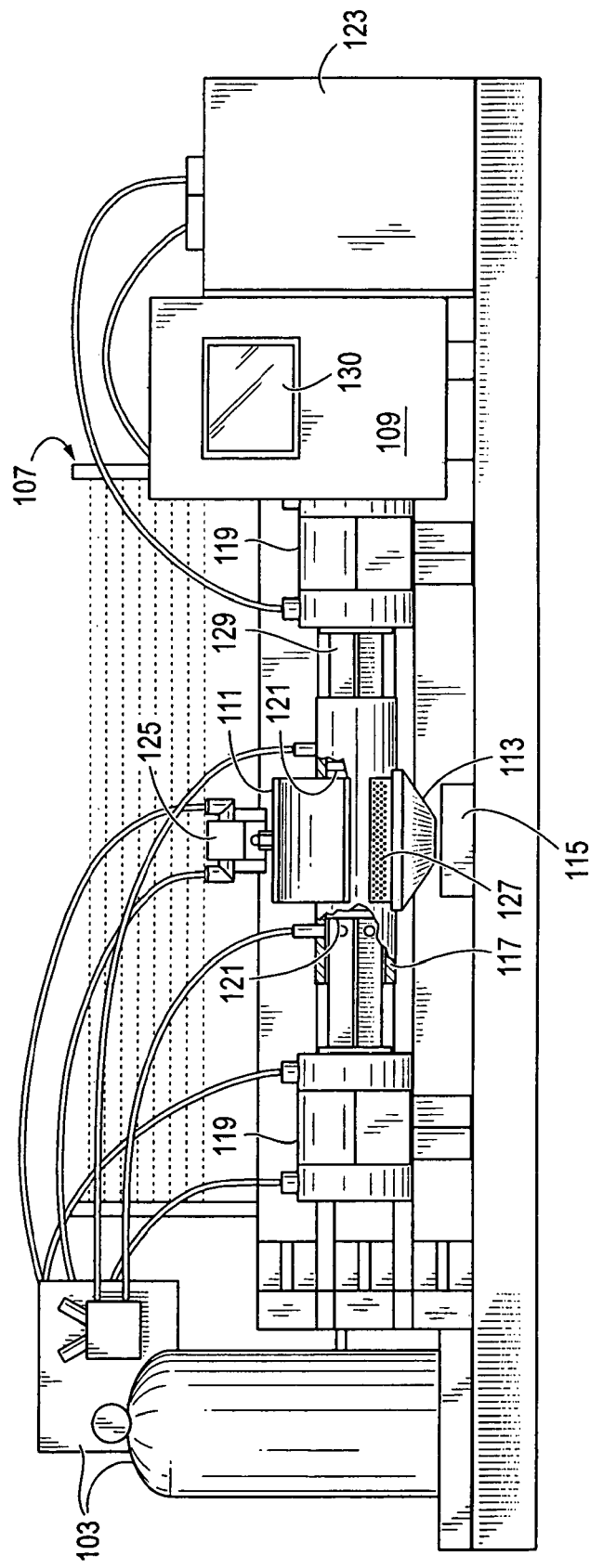
FIG. 2B is a side view of the biomass compactor shown in FIG. 2A.
Figure 2C:
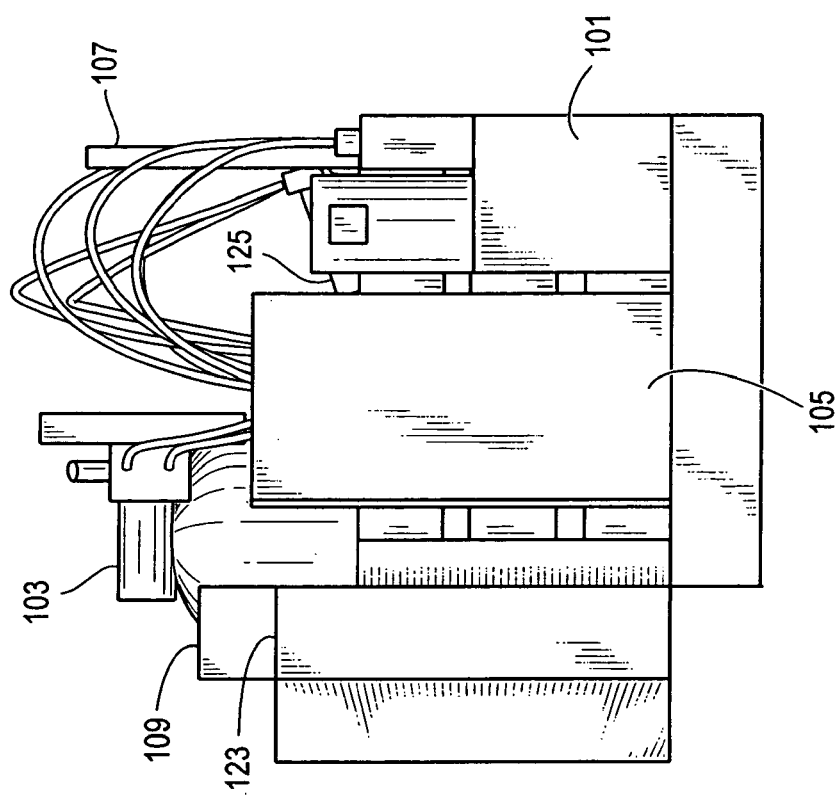
FIG. 2C is an end view of the biomass compactor shown in FIG. 2A.

FIG. 2B depicts a detailed side view of the compactor 100 shown in FIG. 2A. In this non-limiting embodiment, feedstock material is preheated prior to compaction. Heating may be accomplished by heating methods known in the art, including—but not limited to—steam heat or dry heat. Commercially available equipment, such as autoclaves, ovens, and the like, may be used to preheat the feedstock material. Preheating is also suitably accomplished by utilizing waste heat derived from process units—such as a compressor or engine—so as to reduce or even minimize the net energy consumption of the compactor 100. Such embodiments include a system adapted to recycle at least part of the waste heat evolved by operation of the devices.

Feedstock material is loaded into the compaction chamber 117 through a hatch door 111. The chamber 117 is suitably overfilled and the hatch door 111 is then closed by a hatch door actuator 125 to pre-compress material into the chamber 117. Suitable actuators 125 include hydraulic cylinders, such as the cylinder shown in FIGS. 2A and 2B. Although the chamber 117 need not necessarily be overfilled, it may be advantageous to maximize the amount of feedstock material that is processed in a single compression cycle.

In operation, after the first batch of feedstock material is pre-compressed into the chamber 117, the hatch door 111 is opened, and additional material is loaded. The hatch door 111 again pre-compresses material into the chamber 117. This stage is then repeated as necessary or as is optimal according to the feedstock material type. Hatch doors 111 may be of essentially any shape and may be secured by hinges, bolts, latches, and the like.

After loading, the compaction cylinders 119 (powered by the hydraulic power unit 101) that are part of the compactor ram assembly 129 compress material toward the center of the chamber 117. Extracted liquid is drained from the chamber 117 through dewatering holes 127 of the compaction chamber 117 and then collected in a dewatering trough 113 and tray 115. Extracted liquid may be further filtered or otherwise treated (e.g., to remove or to neutralize impurities or other substances that may be in the liquid) before or after collection. Extracted liquid may also be used to cool parts of the compactor 100, further reducing net utility consumption.

Compressed air from the air compressor 103 is used during the compaction stage to promote water evacuation from the chamber 117. Other mechanisms to promote water evacuation—such as application of reduced pressure—may also be suitably applied. Upon completion of this stage, the contents of the collection tray 115 are pumped or flow to a storage tank (not shown). Compressed air is used to dislodge the compacted material from the end effector plates 121, which may be removable and are described in additional detail in FIGS. 4, 5, and 6. Compacted material may also be mechanically removed from the end effector plates 121.

The operation of the compactor 100 is governed in part by the power distribution panel 105 and the control panel 109. A safety light curtain 107 is suitably disposed to provide warning functions to users and others in proximity to the compactor 100. The operation is also monitored by a meter panel 123, which panel suitably provides information concerning the status of the compactor 100. Such information may be observed on the human-machine interface (HMI) display 130. The pressure and position of the cylinders and rams are constantly monitored by a programmable control system, located behind the control panel 109 in FIG. 2B, as are the material temperature in the compaction chamber 117, the power usage of each power unit 101, and the liquid level in the tray 115. The control system is programmed to continue each stage of the load/compaction cycle until time, pressure, distance, and liquid level limits have been reached.

C. Mobile, Full Scale Biomass Compactor

Figure 3A:
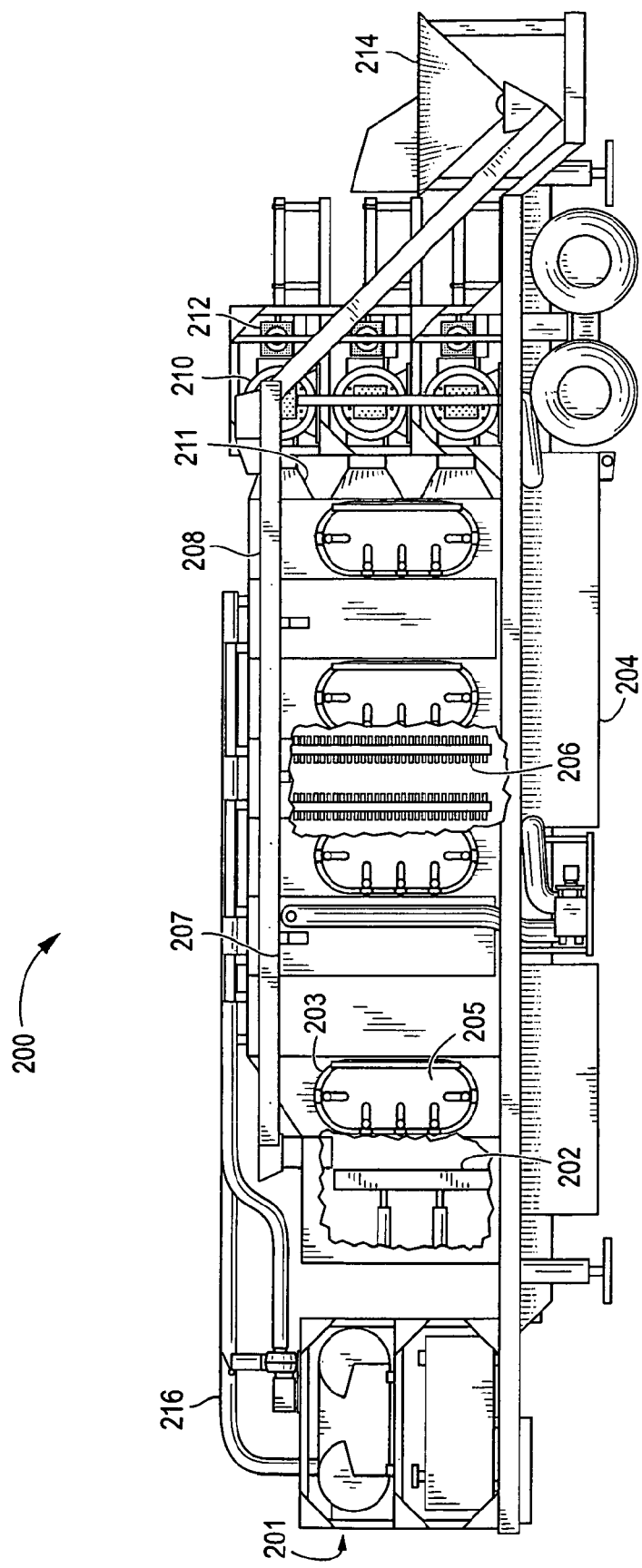
FIG. 3A is a side view of a full scale biomass compactor according to another embodiment of the present invention.
Figure 3C:
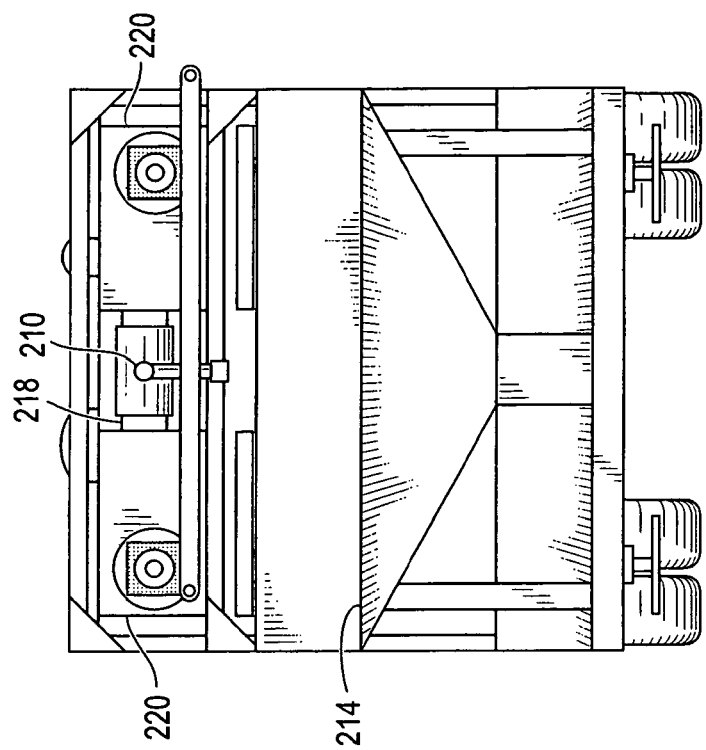
FIG. 3C is a rear view of the biomass compactor shown in FIG. 3A.
Figure 3B:
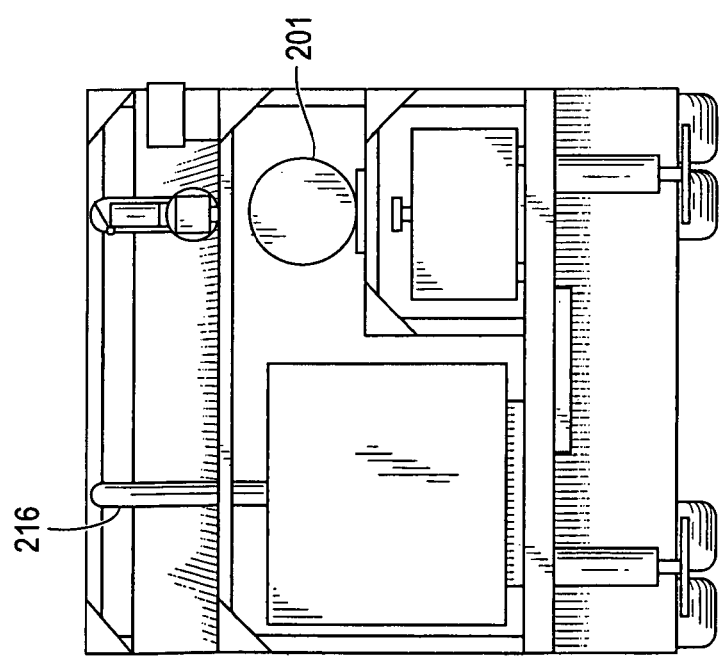
FIG. 3B is a front view of the biomass compactor shown in FIG. 3A.

A mobile, full scale, two-stage compactor 200 according to another embodiment of the present invention is shown in FIGS. 3A, 3B, and 3C. In FIG. 3A, feedstock is loaded into the bin 214 at the rear of the skid and conveyed by a load conveyor 208 to the entry portal 203 of the preheat chamber 207. A large ram 202 in the entry portal 203, which is powered by a diesel power unit 201, presses the material into the preheat chamber 207, forcing material past heat exchangers 206 charged using exhaust gas from the power unit 201 that is recovered and transported by an exhaust recovery system 216. At the exit 211 of the preheat chamber 207, material is extruded through nozzles into the high pressure compaction chambers 210.

Entry doors 205 may be disposed along the preheat chamber 207 to allow for entry into the preheat chamber 207 for cleaning and other maintenance functions. Portholes and other openings may be used in place of or in addition to the entry doors 205.

As shown in FIG. 3A, the high pressure compaction chambers 210 may be oriented orthogonal to the preheat chamber 207 so that the high pressure compaction chambers 210 are properly oriented to act upon material pushed into the chambers 210 by action of the preheat chamber ram 202. Other configurations where the high pressure compaction chambers 210 are oriented parallel or otherwise to the preheat chamber 207 are possible. The embodiment of the present invention illustrated in FIGS. 3A, 3B, and 3C has the disadvantage that the biomass material is preheated before it is compressed. One important aspect of the present invention is the discovery that it often enhances the efficiency of the process to compress the biomass material, thereby removing water, before a step of heating the biomass material is applied.

FIG. 3B is a front view of the compactor 200 shown in FIG. 3A. FIG. 3C is a rear view of the same compactor 200. FIG. 3C depicts, at its top, two high-pressure compaction chambers 210, which chambers 210 are opposed to each other. A ram 218 disposed between the two chambers 210 at the top of FIG. 3B acts on each chamber 210 in an alternating fashion. When the ram 218 moves from right to left, it acts upon material residing within the left-hand chamber 210, and when the ram 218 moves from left to right, it acts up on material residing within the right-hand chamber 210. In the embodiment shown in FIG. 3B, the ram 218 is opposed by a stationary wall 220. In other embodiments, the ram 218 is opposed by another ram.

The compaction chambers 210 compress the material and remove moisture content. The extracted liquid drains into the storage tank 204 below. A shuttle plate 212 transfers the compressed material from the compaction chambers 210 onto a conveyor that moves the finished product off the skid to a storage vehicle.

D. Example End Effector Plates

As foreshadowed above, the end effector plates may have a variety of configurations. FIGS. 4 and 4A depict an end effector plate 400 having a pyramidal surface profile. A plurality of pyramids 402 each include apertures 404 that extend through the pores and the end plate so as to permit passage of moisture and other materials liberated from a feedstock when the feedstock is compressed. In some embodiments, only a portion—or none—of the pyramids 402 have such pores. The end effector plate 400 may also include pores that are disposed on the surface between two adjacent pyramids 402. The pyramids 402 may be polygonal in cross-section, as shown, but may have essentially any cross-section. The pyramids 402 may all be of the same height or of different heights, depending on the characteristics of the biomass material. The pyramids 402 may also be flat-topped or even mesa-like in profile, and can also terminate in a point; mixtures of flat-topped and pointed pyramids are all within the scope of the present invention.

FIGS. 5 and 5A depict a concave dish end effector plate 410. The plate 410 includes a concave profile 412 and apertures 414 that extend through the plate 410 so as to permit passage of fluid and other material liberated from a feedstock upon compression. The plate 410 may also have a convex profile, as needed, and may also include surface features, such as channels, pyramids, mesas, and the like.

FIGS. 6 and 6A depict a starburst-type end effector plate 420 having channels 422 that run along the surface. These channels 422 are useful for conveying away from the center of the plate 420 fluids or other materials that may be liberated from feedstock materials as the materials are compacted. There may also be pores or openings within the channels 422 that extend through the end effector plate 420 so as to permit passage of fluids or other materials through the plate 420.

The various features shown in FIGS. 4, 4A, 5, 5A, 6, and 6A can be combined with one another to form a customized end effector plate. As one non-limiting example, a plate may include channels 422 as shown in FIG. 6A as well as the pyramids 402 and apertures 404 shown in FIG. 4A. The optimum combination of surface profile and surface features will be dictated by the particular application, and it will be apparent to those of ordinary skill in the art to combine certain features to arrive at the optimal configuration.

As discussed elsewhere, end effector plates may be of a variety of configurations and surface profiles. Likewise, a wall or other structure that opposes a piston may also be of any number of configurations. For example, an opposing wall may include apertures to permit removal of liquid liberated from the compaction of feedstock material, channels to help transport such liberated liquid, a concave or convex profile, and the like. The opposing wall or structure may have the same or a different surface profile than the end effector plate of an opposing piston.

E. Multi-Stage Biomass Compactor

FIGS. 7, 8, 8A, 9, and 10A-10H depict another embodiment of the present invention, namely a multi-stage biomass compactor 500. As illustrated, the compactor 500 has three, separate compression stages and one heated extrusion stage. Advantageously, each of the three compression stages compress the biomass in one of the three orthogonal directions. Thus, for example, the first compression stage (C1) acts in the x-direction; the second compression stage (C2) acts in the y-direction; and the third compression stage (C3) acts in the z-direction.

Fluid (e.g., water) present in the biomass is removed via compression and extrusion rather than by baking upon application of heat. This sequence avoids having to overcome the latent heat of vaporization of water and, therefore, allows the compactor 500 to achieve a net energy gain from the biomass. By the time heat is applied to the biomass, a large amount of its moisture (e.g., 60-80%) has already been removed. Then, heat is applied to the biomass to melt or liquefy the lignins present in the biomass. The lignins act as glue, holding the biomass together as a biobrick 50, and may provide a protective coating. Because most of the water is removed before heat is applied, however, less energy is required to melt the lignins.

Figure 7:
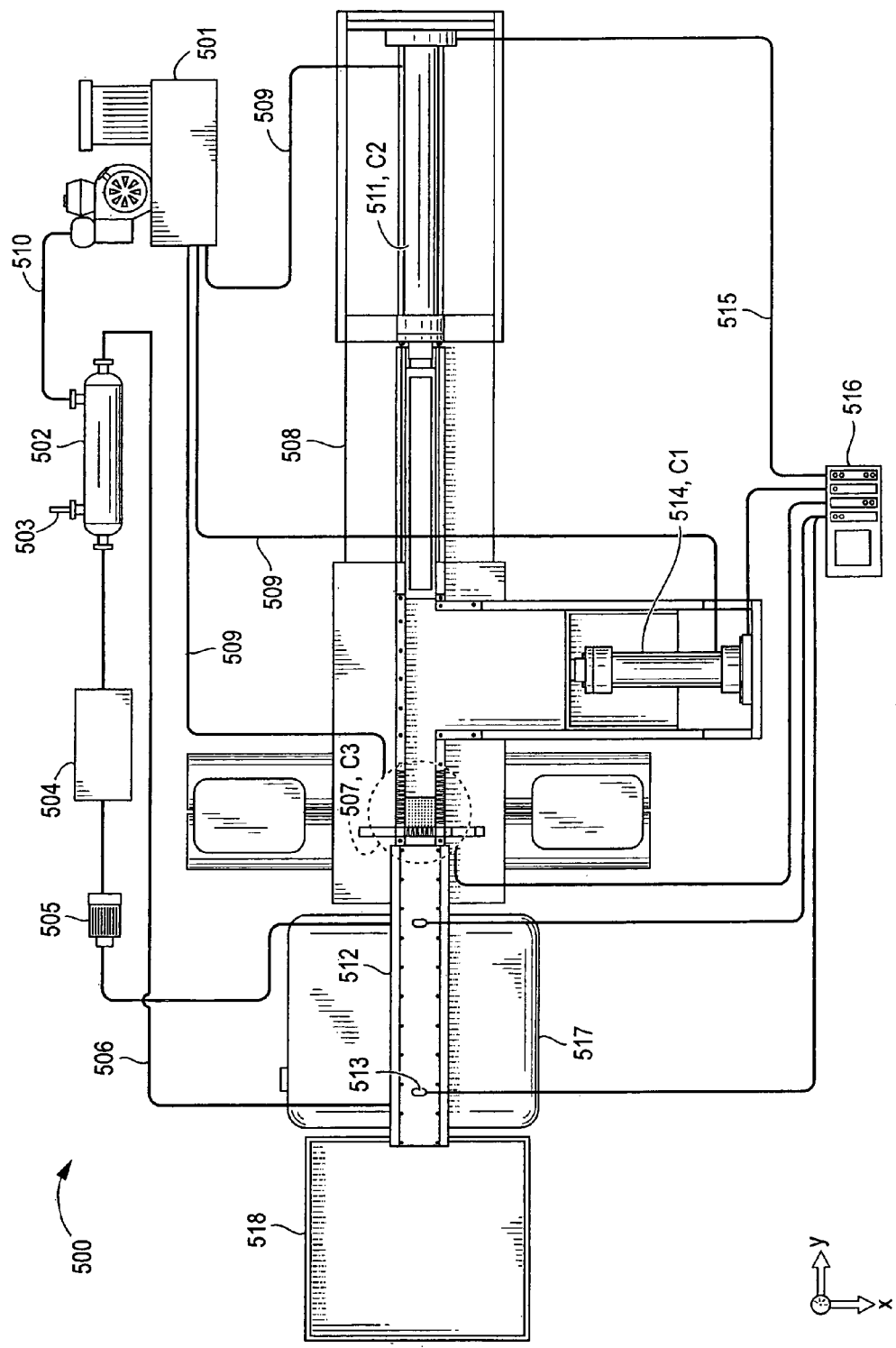
FIG. 7 is a plan view of a multi-stage biomass compactor according to another embodiment of the present invention.

FIG. 7 is a plan view of the multi-stage biomass compactor 500. A hydraulic power unit 501 provides compressive force through hydraulic fluid circulation tubes 509 to the three compaction cylinders 514 (C1), 511 (C2), and 507 (C3) to which it is connected. Other mechanisms for providing power to the compaction cylinders will be apparent to those of ordinary skill in the field. A heat exchanger 502 is charged using exhaust gas from the power unit 501 that is recovered and delivered through an exhaust pipe 510. Heat derived from the exhaust gas of the power unit 501 is delivered to the heated extrusion chamber 512 to heat the biomass (following the three compression stages) and prompt lignin movement. Other components that form part of the power generation system include the exhaust port 503, the reserve oil tank 504, the oil pump 505, and the oil circulating piping 506.

The compactor 500 is housed in a compactor frame assembly 508. A programmable logic controller 516 (or PLC) is provided to receive information from various components of the compactor 500 and to control the operation of each of the four stages. The PLC 516 receives and transmits signals along control wiring 515. For example, the heated extrusion chamber 512 may have one or more thermocouples 513 that measure the temperature in the chamber 512 and send a commensurate signal to the PLC 516.

Figure 8:
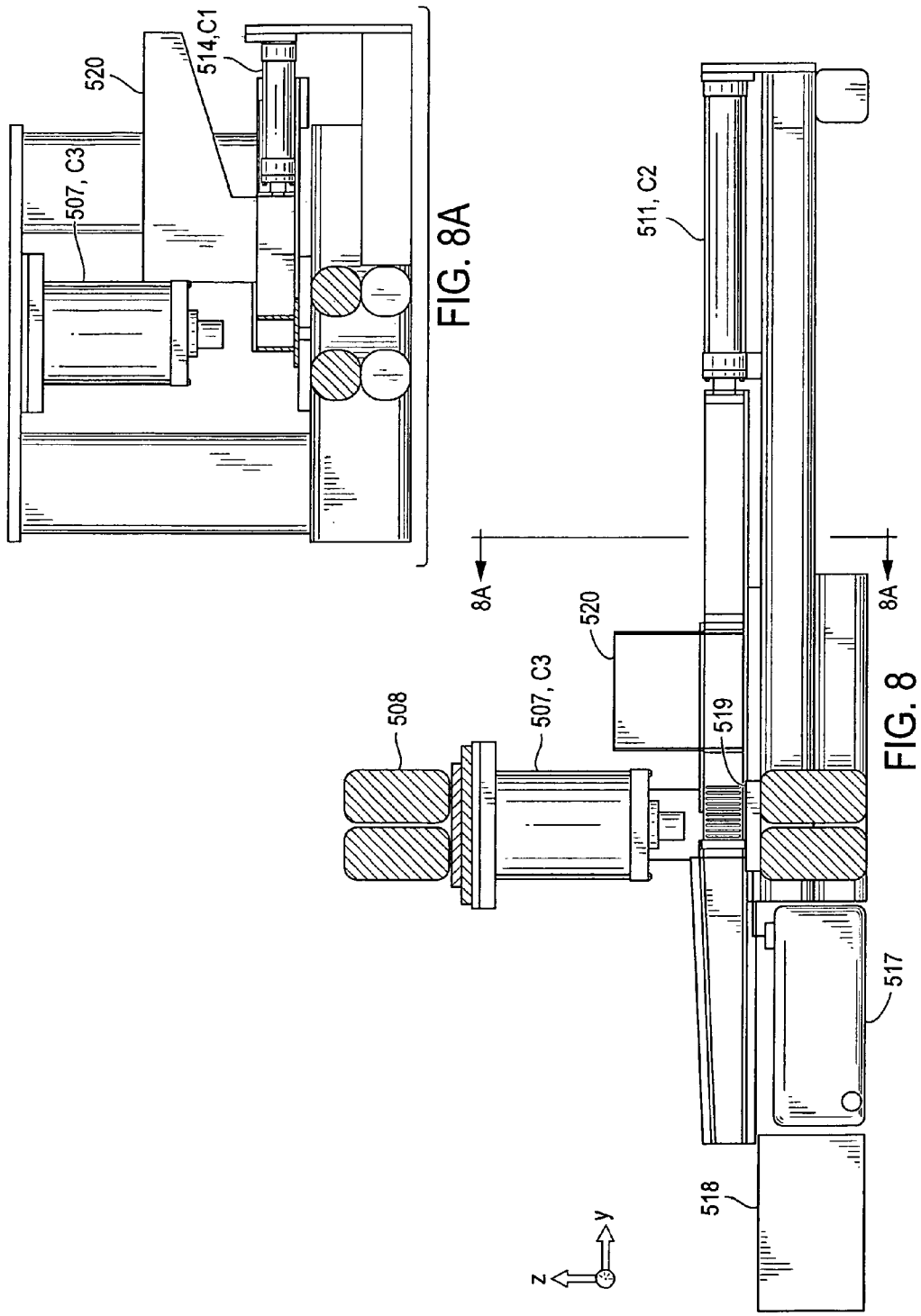
FIG. 8 is an elevation view of the biomass compactor shown in FIG. 7.

Liquid removed from the biomass as the biomass is processed by the compactor 500 is collected in the liquid collection tank 517. As shown in FIG. 8, a liquid collection tray 519 may facilitate collection of the liquid and delivery of that liquid to the liquid collection tank 517. The collected liquid is useful, as noted above, as a commercially desirable byproduct. The end-product biobricks 50 are collected in the product collection bin 518.

Figure 9:
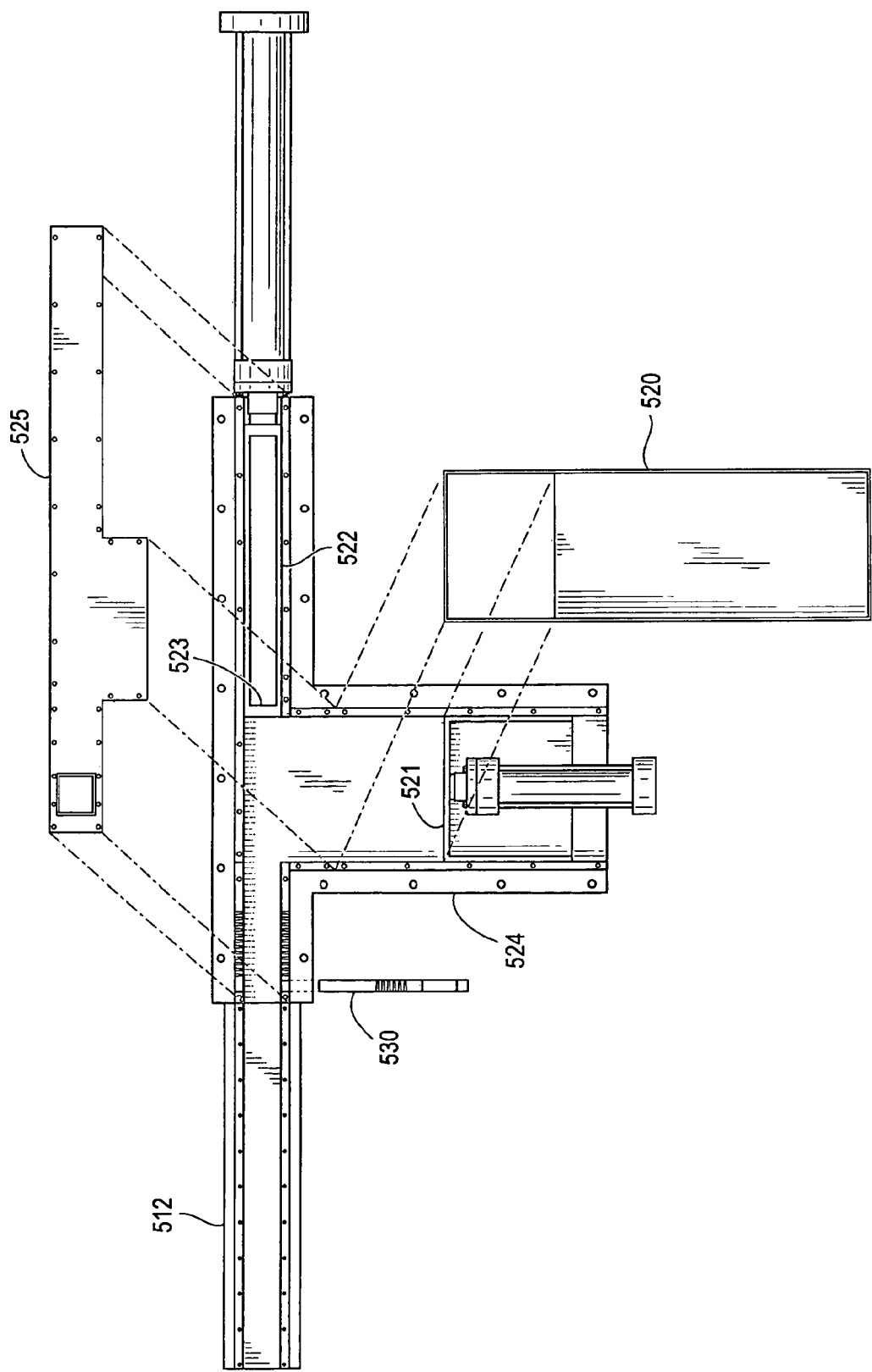
FIG. 9 is another plan view of the biomass compactor shown in FIGS. 7, 8, and 8A highlighting several components of the compactor.

The heated extrusion chamber 512 is further illustrated in FIG. 9. FIG. 9 also highlights the raw material loading bin 520 into which the raw biomass is delivered for processing. The raw biomass is first loaded from the raw material loading bin 520 into the chamber in front of the first ram 521 of the stage one compaction cylinder 514 (C1). The raw biomass may be loaded into the chamber by manual or automatic mechanisms; a conveyor, chute, or other material transport device is useful for introducing the biomass into the compression chamber.

Upon actuation, the first ram 521 compresses the biomass against the side wall 522 of the stage two compaction cylinder 511 (C2) (shown open in FIG. 9). The first ram 521 acts in the x-direction and exerts an example pressure of about 1,000 psi on the biomass. This action achieves about a 3:1 compaction and removes air, although not much (if any) moisture, from the biomass.

Subsequently, with the slide gate 530 in the closed position (it is open in FIG. 9), the second ram 523 of the stage two compaction cylinder 511 (C2) compacts the biomass. The second ram 523 acts in the y-direction and exerts an example pressure of about 5,000 psi on the biomass. This action achieves about a 4:1 (combined with the first stage to achieve an overall compaction of about 12:1) compaction and removes a significant amount (e.g., about 25%) of the moisture from the biomass.

As a final compression step, a third ram (not shown) of the stage three compaction cylinder 507 (C3) compacts the biomass. The third ram acts in the z-direction and exerts an example pressure of about 20,000 psi or more on the biomass. This action achieves about a 1.5:1 (combined with the first and second stages to achieve an overall compaction of about 18:1) compaction and removes the vast majority (e.g., leaving only about 10-20%) of the moisture from the biomass.

As illustrated in FIG. 9, the slide gate 530 has three separate and distinct areas. Its open area allows material to pass through the slide gate 530 without obstruction. Its slotted area allows water to pass through, but prevents biomass from passing through, the slide gate 530. Finally, its solid area prevents material passage and provides a surface against with a ram can exert pressure. The slide gate 530 slides along a channel provided in the base plate 524. The compactor 500 has a top plate 525 disposed opposite the base plate 524.

The orientation of the slots in the slotted area of the slide gate 530 is important. Specifically, the slots should be perpendicular to (i.e., oriented at an angle of 90 degrees relative to) the direction of the compaction force. Such an orientation minimizes clogging of the slots with compressed material.

FIGS. 10A-10H illustrate eight steps of the operational sequence by which the compactor 500 compresses the raw biomass material 12. The steps are repeated in a cyclical manner to continuously process the raw biomass material 12. FIG. 10A depicts the first step, during which Batch 1 of the raw biomass material 12 is loaded from the raw material loading bin 520 into the chamber in front of the first ram 521 of the stage one compaction cylinder 514 (C1). Note that the side wall 522 of the stage two compaction cylinder 511 (C2) is closed in FIG. 10A so that the raw biomass material 12 is retained between the first ram 521 and the side wall 522.

The first ram 521 is actuated in the second step of the operational sequence. Actuation compresses the raw biomass material 12 against the side wall 522 of the stage two compaction cylinder 511 (C2) as shown in FIG. 10B. In the third step, shown in FIG. 10C, the side wall 522 of the stage two compaction cylinder 511 (C2) retracts. Such retraction allows the first ram 521 to push the raw biomass material 12 into the main chamber in front of the stage two compaction cylinder 511 (C2).

In the fourth step of the operational sequence, as shown in FIG. 10D, the first ram 521 holds its position to limit the extent of the main chamber in front of the stage two compaction cylinder 511 (C2). The slide gate 530, which has been closed for each of the first three steps, remains closed throughout the fourth step. The second ram 523 of the stage two compaction cylinder 511 (C2) is actuated. Actuation compresses the raw biomass material 12 against the closed slide gate 530.

In the fifth step, shown in FIG. 10E, the slide gate 530 is moved to its slotted position while the second ram 523 of the stage two compaction cylinder 511 (C2) holds its position. The first ram 521 of the stage one compaction cylinder 514 (C1) retracts so that another load (Batch 2 of the raw biomass material 12a) can be delivered to the chamber in front of the first ram 521. Meanwhile, the third ram (not shown) of the stage three compaction cylinder 507 (C3) compacts the raw biomass material 12. Such compaction forces moisture from the biomass 12 and through the slots of the slide gate 530.

In the sixth step of the operational sequence, as shown in FIG. 10F, the third ram retracts and the slide gate 530 moves to its open position. The open slide gate 530 allows the second ram 523 to push the raw biomass material 12 into the heated extrusion chamber 512. Meanwhile, the first ram 521 is actuated so that it compresses the Batch 2 raw biomass material 12a against the side wall 522 of the stage two compaction cylinder 511 (C2) (as was done in the second step shown in FIG. 10B).

In the seventh step of the operational sequence, as shown in FIG. 10G, the slide gate 530 returns to its closed position. The side wall 522 of the stage two compaction cylinder 511 (C2) retracts, allowing the first ram 521 to push the Batch 2 raw biomass material 12a into the main chamber in front of the stage two compaction cylinder 511 (C2).

Finally, in the eighth step of the operational sequence, as shown in FIG. 10H, the first ram 521 holds its position, as it did in the fourth step shown in FIG. 10D, to limit the extent of the main chamber in front of the stage two compaction cylinder 511 (C2). The slide gate 530 remains closed. The second ram 523 of the stage two compaction cylinder 511 (C2) is actuated. Actuation compresses the raw biomass material 12a against the closed slide gate 530.

When it reaches the heated extrusion chamber 512, the compacted biomass material 12 contains significantly reduced moisture content. Waste heat from the power unit 501 is used to heat the compacted biomass material 12 to a suitable biomass extrusion temperature in the heated extrusion chamber 512. A typical example temperature is about 350° F. or more, which is sufficient to move the lignins in the biomass material 12 and create the "glue" that holds the biobricks 50 together. The heated extrusion chamber 512 slants downward to further compress the biomass.

Because moisture is removed from the biomass material 12 before the biomass material 12 is heated, nutrients remain in the water and enhance the desirability of the water that is removed from the compactor 500 as a byproduct. The process also yields biobricks 50 with both a low nitrogen content and low alkalinity (the alkalinity can be reduced by more than 50% per MM BTU). The biobricks 50 also have a moisture content of about 30% or less. The density of the biobricks 50 can be increased more than eleven times relative to the raw biomass (from about 7 lbs/ft$^3$ to about 80 lbs/ft$^3$ or from about 0.11 g/ml to about 1.3 g/ml). The net energy value of the biobricks 50 increases by more than 50% per pound. In summary, the biobricks 50 produced in accordance with the present invention can successfully and economically supplant such conventional fuels as coal. Transportation costs are reduced by a factor of twenty-two and the shelf life of the biobricks 50 is a matter of years, rather than weeks as for raw biomass.

F. System Overview

Figure 11:
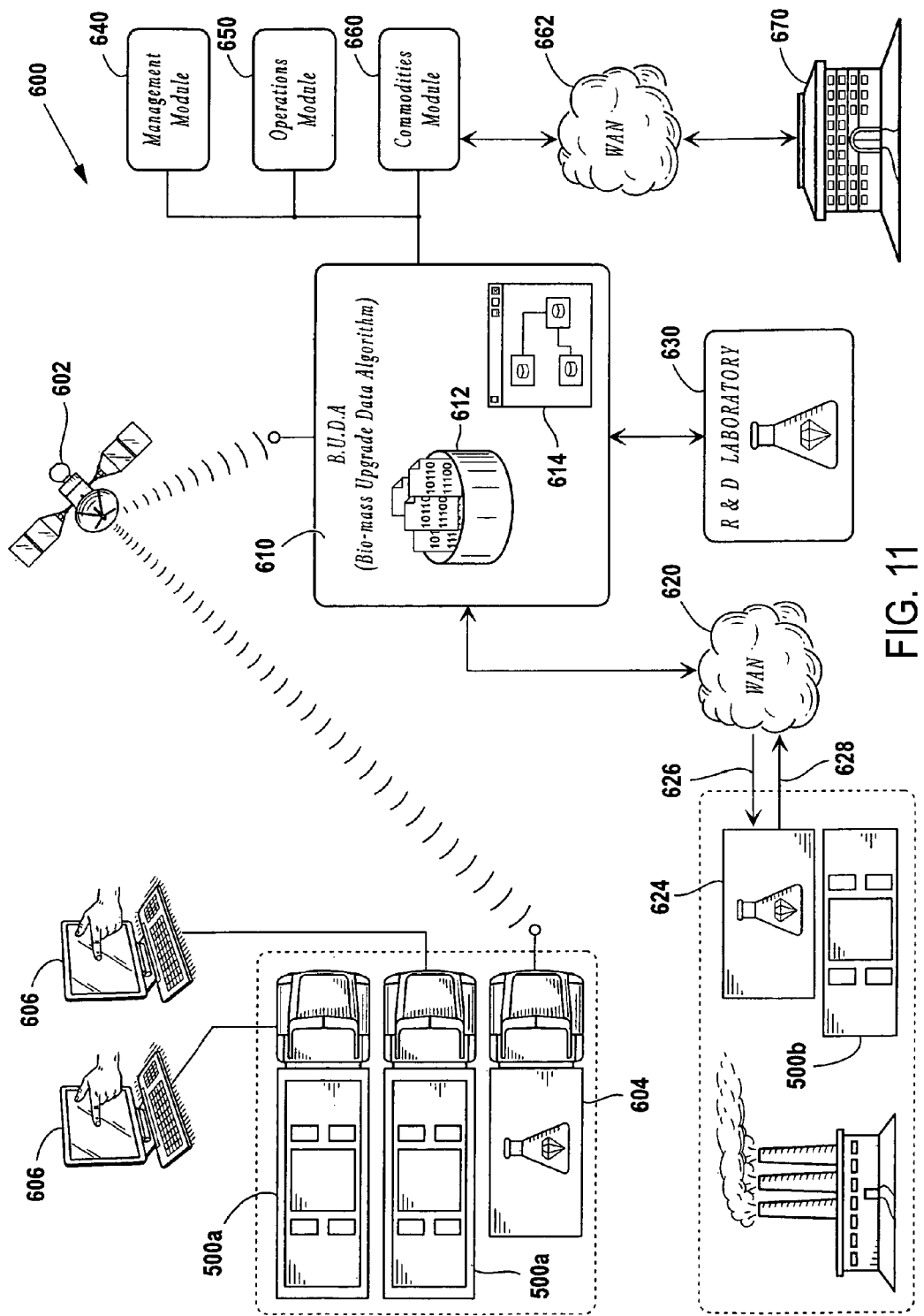
FIG. 11 illustrates an overview of a global system incorporating one or more compactors according to the present invention.

FIG. 11 illustrates an overview of a global system used to manage and integrate the functions of locating and gathering raw biomass material 12, processing the biomass material 12 in compactors as described above, and delivering the processed biobricks 50 to energy-generating plants for use as fuel. The global system 600 utilizes satellite technology that enables communication with remote areas where other, conventional communication methods are unavailable. For example, the satellite 602 can communicate with one or more mobile field laboratories 604. The mobile field laboratories 604 operate in connection with one or more mobile compactors 500a. The mobile compactors 500a are used to process biomass material 12 on site. A monitor 606 is located at the center of each mobile compactor 500a; preferably, the monitor 606 is touch screen and weatherproof.

The satellite 602 also communicates with a biomass upgrade data algorithm or "BUDA" 610. BUDA 610 has electronic components 614 and a library 612 of biomass processing data and algorithms for analyzing material characteristics and processing results. BUDA 610 transmits processing recipes to field units at the onset of processing, collects processing performance data from mobile and stationary processing units for analysis, and facilitates research and development on processing recipes for new materials and conditions.

Stationary compactors 500b, along with stationary field laboratories 624, may be located proximate or in factories that create biomass as a byproduct. Such factories include, for example, potato factories and breweries. BUDA 610 can provide information, such as a biomass processing recipe, to the stationary compactors 500b and the stationary field laboratories 624 in the direction of communication arrow 626. The stationary compactors 500b and the stationary field laboratories 624 return information, such as local recipe adjustments, Global Positioning System coordinates, and production data, to BUDA 610 in the direction of communication arrow 628. Such information exchanges can be accomplished using a Wide Area Network (WAN)

BUDA 610 also communicates with a research and development laboratory 630. At the research and development laboratory 630, scientists work with material and processing data to develop and refine processing "formulas." Such formulas include, for example, compaction ratios, compaction speeds (which impact water extraction), and heating times and temperatures.

Finally, BUDA 610 also communicates with a variety of additional modules that facilitate operations of the global system 600. Example modules are illustrated in FIG. 11 and include a management module 640, an operations module 650, and a commodities module 660. The management module 640 addresses financial data and performs such functions as strategic planning and human resource management. The operations module 650 assists with such functions as the location of field units, processing efficiency, deployment schedules, and cost collection. The commodities module 660 addresses data relating to feedstock trading, product trading, and carbon dioxide credit trading.

As shown in FIG. 11, the commodities module 660 may communicate via a WAN 662 with a commodities trading facility 670. Because BUDA 610 is tied to the commodities markets, BUDA 610 knows what product mix is best. For example, a market might exist for biobricks 50 having a 30% moisture content, which renders processing the biobricks 50 to a lower moisture content unnecessary.

The biomass produced in accordance with the present invention solves at least three of the limiting problems that have prevented widespread use of biomass as fuel. First, conventional biomass has a low energy density; the biobricks 50 of the present invention have a much higher energy density. Second, transportation costs are prohibitive for conventional biomass; the biobricks 50 can be transported just like coal. Finally, the undesirable chemistry of conventional biomass, including high nitrogen content and alkalinity, is avoided by the biobricks 50.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges. It is also intended, unless expressly stated otherwise, that the steps of the methods practiced pursuant to the present invention are not limited to any particular order.

What is claimed:

1. A super compactor configured to receive biomass and deliver a brick suitable as fuel for power generation, the super compactor comprising:
   an inlet adapted to receive the biomass from an external source;
   a compaction chamber configured to receive the biomass from the inlet and having:
   (a) at least one ram configured to reciprocate along a travel path and exert a predetermined amount of pressure on the biomass,
   (b) a movable slide gate compressible against the biomass, the slide gate being configured to switch between a closed configuration, a slotted configuration, and an open configuration, the gate defining a first outer perimeter, wherein, when the movable slide gate is in the slotted configuration, the movable slide gate defines at least a pair of recesses that each define a second outer perimeter, wherein an entirety of the second outer perimeter is spaced at a distance from the first outer perimeter and each of the pair of recesses extends at least partially through a thickness of the gate so as to promote the removal of moisture from the biomass, and
   (c) one or more dewatering apertures configured to permit moisture to pass through to a moisture collector configured to capture moisture that passes through the dewatering apertures;
   a power unit configured to provide power to the at least one ram; and
   a heated extrusion chamber configured to receive the biomass from the compaction chamber, the heated extrusion chamber being separated from the compaction chamber by the movable slide gate, wherein the heated extrusion chamber is configured to receive the biomass from the compaction chamber when the movable slide gate is in the open configuration, the heated extrusion chamber being further configured to heat and compact the biomass to bind the biomass and form the brick.

2. The super compactor of claim 1, wherein the super compactor is configured such that the predetermined amount of pressure on the biomass reduces the volume of the biomass by a factor of about 10:1 or more.

3. The super compactor of claim 1, wherein the super compactor is configured such that the predetermined amount of pressure on the biomass reduces the moisture in the biomass to about 30% or less.

4. The super compactor of claim 1, wherein the compaction chamber is configured to operate at a speed that enables the super compactor to process about 25 tons of the biomass per hour.

5. The super compactor of claim 1, wherein the power unit is configured to create heat and the super compactor further comprises a heat exchanger configured to deliver the heat created by the power unit to the heated extrusion chamber.

6. The super compactor of claim 1, wherein the compaction chamber has three, separate rams each having a separate travel path disposed along one of three orthogonal directions.

7. The super compactor of claim 1, further comprising a programmable logic controller configured to receive information from various components of the compactor and control the operation of the components.

8. A method of creating a brick suitable as fuel for power generation from biomass, the method comprising:
(a) positioning the biomass;
(b) pre-processing the biomass to a suitable size and water content;
(c) delivering the biomass to a compaction chamber of a super compactor;
(d) actuating the super compactor to exert a predetermined amount of pressure of between 10,000 psi and 200,000 psi on the biomass, thereby squeezing water out of and collapsing voids in the biomass, the super compactor having a moveable slide gate that is configured to switch between a closed configuration, a slotted configuration, and an open configuration, such that when the moveable slide gate is in the slotted configuration, at least a portion of the water passes through at least a pair of recesses extending at least partially through a thickness of a movable slide gate;
(e) collecting the water squeezed out of the biomass;
(f) positioning the movable slide gate in the open configuration;
(g) moving the biomass from the compaction chamber to a heated extrusion chamber, the heated extrusion chamber being separated from the compaction chamber by the movable slide gate; and
(h) heating the biomass to form the brick.

9. The method of claim 8, wherein the step of heating further forms a protective coating on the brick.

10. The method of claim 8, wherein the predetermined amount of pressure exerted by the super compactor on the biomass reduces the volume of the biomass by a factor of about 10:1 or more.

11. The method of claim 8, wherein the predetermined amount of pressure exerted by the super compactor on the biomass reduces the water in the biomass to about 30% or less.

12. The method of claim 8, further comprising the step of extruding the biomass through a die to form a brick of a predetermined shape.

13. The method of claim 8, further comprising the step of transporting the brick to a power generation plant for use as fuel.

14. A super compactor configured to receive biomass and deliver a brick suitable as fuel for power generation, the super compactor comprising:
an inlet adapted to receive the biomass from an external source;
a compaction chamber configured to receive the biomass from the inlet and having:
(a) at least one ram configured to reciprocate along a travel path and exert a predetermined amount of pressure on the biomass,
(b) a movable slide gate compressible against the biomass, the slide gate being configured to switch between a closed configuration, a slotted configuration, and an open configuration, the gate defining a center and an outer perimeter, wherein, when the moveable slide gate is in the slotted configuration, the movable slide gate defines at least one recess that extends between the center and the outer perimeter, the at least one recess extending at least partially through a thickness of the gate so as to promote the removal of moisture from the biomass, and
(c) one or more dewatering apertures configured to permit moisture to pass through a moisture collector configured to capture moisture that passes through the dewatering apertures;
a power unit configured to provide power to the at least one ram; and
a heated extrusion chamber configured to receive the biomass from the compaction chamber, the heated extrusion chamber being separated from the compaction chamber by the movable slide gate, wherein the heated extrusion chamber is configured to receive the biomass from the compaction chamber when the movable slide gate is in the open configuration, the heated extrusion chamber being further configured to heat and compact the biomass to bind the biomass and form the brick.

15. The method of claim 8, wherein the movable slide gate is compressible against the biomass, the gate defining a first outer perimeter and further defining at least a pair of recesses that each define a second outer perimeter, wherein an entirety of the second outer perimeter is spaced at a distance from the first outer perimeter and each of the pair of recesses extends at least partially through a thickness of the gate so as to promote the removal of moisture from the biomass.

16. The method of claim 8, wherein the movable slide gate is compressible against the biomass, the gate defining a center and an outer perimeter, and further defining at least one recess that extends between the center and the outer perimeter, the at least one recess extending at least partially through a thickness of the gate so as to promote the removal of moisture from the biomass.

17. The method of claim 8, wherein the step of actuating the super compactor includes actuating the super compactor to exert at least 20,000 psi on the biomass.

18. The method of claim 8, wherein the step of actuating the super compactor includes actuating the super compactor to exert at least 50,000 psi on the biomass.

19. The method of claim 8, wherein the step of actuating the super compactor includes actuating the super compactor to exert at least 100,000 psi on the biomass.

* * * * *